(12) United States Patent
Kim et al.

(10) Patent No.: US 11,223,929 B2
(45) Date of Patent: Jan. 11, 2022

(54) ELECTRONIC DEVICE FOR DETERMINING P2P OPERATING CHANNEL AND METHOD THEREOF

(71) Applicant: Samsung Electronics Co., Ltd., Suwon-si (KR)

(72) Inventors: Jinho Kim, Suwon-si (KR); Geunyoung Yu, Suwon-si (KR); Deoknam Kim, Suwon-si (KR); Jiwoong Park, Suwon-si (KR); Sangu Shim, Suwon-si (KR); Saehun Oh, Suwon-si (KR); Sukun Yoon, Suwon-si (KR)

(73) Assignee: SAMSUNG ELECTROICS CO., LTD., Suwon-si (KR)

( * ) Notice: Subject to any disclaimer, the term of this patent is extended or adjusted under 35 U.S.C. 154(b) by 13 days.

(21) Appl. No.: 16/599,967

(22) Filed: Oct. 11, 2019

(65) Prior Publication Data

US 2020/0120453 A1 Apr. 16, 2020

(30) Foreign Application Priority Data

Oct. 12, 2018 (KR) .......................... 10-2018-0122037

(51) Int. Cl.
*H04W 4/08* (2009.01)
*H04W 4/70* (2018.01)
(Continued)

(52) U.S. Cl.
CPC ............... *H04W 4/08* (2013.01); *H04W 4/12* (2013.01); *H04W 4/70* (2018.02); *H04W 4/80* (2018.02); *H04W 48/16* (2013.01); *H04W 76/14* (2018.02)

(58) Field of Classification Search
CPC ......... H04W 48/16; H04W 4/80; H04W 4/70; H04W 4/08; H04W 76/14; H04W 72/02; H04W 4/12; H04W 84/18; H04W 72/0453
See application file for complete search history.

(56) References Cited

U.S. PATENT DOCUMENTS

2014/0171137 A1 6/2014 Oh et al.
2016/0227535 A1* 8/2016 Sharma ............. H04W 72/1215
(Continued)

FOREIGN PATENT DOCUMENTS

EP 3361769 8/2018
EP 3367744 8/2018
(Continued)

OTHER PUBLICATIONS

Extended European Search Report dated Jan. 31, 2020 in European Patent Application No. 19202639.1.
(Continued)

*Primary Examiner* — Mandish K Randhawa
(74) *Attorney, Agent, or Firm* — Staas & Halsey, LLP

(57) ABSTRACT

Provided are an electronic device and method of determining a peer-to-peer (P2P) operating channel. The electronic device includes a communication interface; and a processor configured to acquire access point (AP) connection information of the electronic device about a wireless connection to an AP and BT connection information of the electronic device about a connection to a Bluetooth device, receive, from a peer device attempting to establish a P2P connection to the electronic device, AP connection information of the peer device about a wireless connection to an AP, determine a P2P operating channel between the electronic device and the peer device based on the AP connection information and the BT connection information of the electronic device and the AP connection information of the peer device, and (Continued)

establish a P2P connection between the electronic device and the peer device according to the determined P2P operating channel.

14 Claims, 27 Drawing Sheets

(51) Int. Cl.
*H04W 76/14* (2018.01)
*H04W 4/80* (2018.01)
*H04W 4/12* (2009.01)
*H04W 48/16* (2009.01)

(56) References Cited

U.S. PATENT DOCUMENTS

| | | |
|---|---|---|
| 2017/0245276 A1 | 8/2017 | Kim et al. |
| 2018/0084399 A1 | 3/2018 | Shimazaki |
| 2018/0249111 A1 | 8/2018 | Kim et al. |

FOREIGN PATENT DOCUMENTS

| | | |
|---|---|---|
| KR | 10-2018-0099267 | 9/2018 |
| WO | WO 2013/016422 | 1/2013 |
| WO | WO 2017/146438 | 8/2017 |

OTHER PUBLICATIONS

International Search Report and Written Opinion of the International Searching Authority dated Jan. 20, 2020 in International Patent Application No. PCT/KR2019/013331.

\* cited by examiner

| CASE 1-4 | TV is 5GHz AP Connected | • TV : DBS suppot<br>• Peer : RSDB support | • TV : DBS suppot<br>• Peer : RSDB not support |
|---|---|---|---|
| A CASE WHERE BT CONNECTION IS NOT CONSIDERED | AP —5GHz(36ch)— TV, connected (or not), AP —5GHz(149ch)— Peer | (a) AP —5GHz(36ch)— TV(GO)/DBS, connected (or not), AP —5GHz(149ch)— Peer(GC)/RSDB, linked 2.4GHz | (b) AP —5GHz(36ch)— TV(GO)/SCC, connected (or not), AP —5GHz(149ch)— Peer(GC)/MCC, linked 5GHz(36ch) |
| A CASE WHERE BT CONNECTION IS CONSIDERED | AP —5GHz(36ch)— TV —BT, connected (or not), AP —5GHz(149ch)— Peer | | (C) AP —5GHz(36ch)— TV(GO)/SCC, connected (or not), AP —5GHz(149ch)— Peer(GC)/MCC, linked 5GHz(36ch) |

FIG. 20

| CASE 2-1 | TV is 2.4GHz AP Connected | • TV : DBS suppot<br>• Peer : RSDB support | • TV : DBS suppot<br>• Peer : RSDB not support |
|---|---|---|---|
| A CASE WHERE BT CONNECTION IS NOT CONSIDERED | (diagram: AP—2.4GHz—TV, AP—2.4GHz—Peer) | (a) AP—2.4GHz—Peer(GC)—RSDB; AP—2.4GHz—TV(GO)—DBS; TV(GO)—5GHz—Peer(GC) | (b) AP—2.4GHz—Peer(GC)—SCC; AP—2.4GHz—TV(GO)—SCC; TV(GO)—5GHz—Peer(GC) |
| A CASE WHERE BT CONNECTION IS CONSIDERED | (diagram: AP—2.4GHz—TV—BT, AP—2.4GHz—Peer) | (c) AP—2.4GHz—Peer(GC)—RSDB; AP—2.4GHz—TV(GO)—DBS; TV(GO)—5GHz—Peer(GC) | (d) AP—2.4GHz—Peer(GC)—MCC; AP—2.4GHz—TV(GO)—DBS; TV(GO)—5GHz—Peer(GC) |

FIG. 22

ELECTRONIC DEVICE FOR DETERMINING P2P OPERATING CHANNEL AND METHOD THEREOF

CROSS-REFERENCE TO RELATED APPLICATION

This application is based on and claims priority under 35 U.S.C. § 119 to Korean Patent Application No. 10-2018-0122037, filed on Oct. 12, 2018, in the Korean Intellectual Property Office, the disclosure of which is incorporated by reference herein in its entirety.

BACKGROUND

1. Field

The disclosure relates to an electronic device and an operating method thereof, and more particularly, to an electronic device and method of optimally determining a peer-to-peer (P2P) operating channel upon a P2P connection.

2. Description of Related Art

Wireless-Fidelity Direct (Wi-Fi Direct) is Wi-Fi based technology defined and authenticated as a standard by the Wi-Fi Alliance. Wi-Fi Direct provides a peer-to-peer (P2P) protocol connection method for direct communications between terminals without network infrastructure equipment, such as an access point (AP) or a router.

A user connects his/her device directly to another device on a network through Wi-Fi Direct to use a desired service, instead of first connecting his/her device to an AP and then connecting it to the other device on the network. Lately, Wi-Fi Direct is installed on various devices, such as TVs, laptop computers, cameras, printers, game consoles, and smart phones, to transmit or share content, such as pictures, video, games, etc., through direct connections between terminals.

A P2P operating channel that will be used for a Wi-Fi Direct connection is determined when a P2P group is created, and generally, a device that will perform a group owner (GO) role selects an operating channel. Wireless network performance (throughput, packet loss, etc.) depends on a P2P operating channel setting upon a P2P connection, and accordingly, optimal channels need to be set according to scenarios for efficient use of wireless bandwidths.

Applications, such as Miracast and device-to-device file transfer, are representative Wi-Fi Direct based application services that can provide a seamless service when a sufficient wireless bandwidth is secured. An operation most influencing wireless network performance during a Wi-Fi Direct connection process is an operation of setting an operating channel in a GO. Setting an operating channel to a 5 GHz band having relatively small interference is more advantageous in view of Wi-Fi Direct connection performance than setting the operating channel to a 2.4 GHz band.

SUMMARY

Provided are an electronic device and method capable of improving wireless performance by determining a peer-to-peer (P2P) operating channel based on Bluetooth connection information greatly influencing communication performance upon a P2P connection.

Additional aspects will be set forth in part in the description which follows and, in part, will be apparent from the description, or may be learned by practice of the presented embodiments of the disclosure.

According to an embodiment of the disclosure, an electronic device includes: a communication interface; a memory storing one or more instructions; and a processor configured to execute the one or more instructions stored in the memory, wherein the processor executes the one or more instructions to acquire access point (AP) connection information of the electronic device about a wireless connection to an access point and Bluetooth (BT) connection information of the electronic device about a connection to a Bluetooth device, receive, from a peer device attempting to establish a P2P connection to the electronic device, AP connection information of the peer device about a wireless connection to an AP, determine a P2P operating channel between the electronic device and the peer device based on the AP connection information and the BT connection information of the electronic device and the AP connection information of the peer device, and establish a P2P connection between the electronic device and the peer device according to the determined P2P operating channel.

According to an embodiment of the disclosure, the processor may be further configured to execute the one or more instructions to determine whether the electronic device has been connected to the Bluetooth device, from the BT connection information, and determine the P2P operating channel by considering the BT connection information prior to the AP connection information of the electronic device and the AP connection information of the peer device according to the determination.

According to an embodiment of the disclosure, the processor may be further configured to execute the one or more instructions to determine, as the P2P operating channel, a channel not overlapping with a channel which the electronic device uses for the connection to the Bluetooth device, in consideration of the BT connection information of the electronic device.

According to an embodiment of the disclosure, the processor may be further configured to execute the one or more instructions to determine a 5 GHz AP channel connected to the electronic device as the P2P operating channel, when the electronic device has been connected to the Bluetooth device and connected to an AP of a 5 GHz band.

According to an embodiment of the disclosure, the processor may be further configured to execute the one or more instructions to determine a basic 5 GHz preference channel set by the electronic device or a 5 GHz channel preferred by the peer device as the P2P operating channel, when the electronic device has been connected to the Bluetooth device and connected to an AP of a 2.4 GHz band.

According to an embodiment of the disclosure, the processor may be further configured to execute the one or more instructions to determine a basic 5 GHz preference channel set by the electronic device or a 5 GHz channel preferred by the peer device as the P2P operating channel, when the peer device has not been connected to an AP.

According to an embodiment of the disclosure, the processor may be further configured to execute the one or more instructions to further receive BT connection information of the peer device about a connection to a Bluetooth device from the peer device, and determine the P2P operating channel further based on the BT connection information of the peer device.

According to an embodiment of the disclosure, the processor may be further configured to execute the one or more instructions to acquire the AP connection information and the BT connection information of the peer device from a message received from the peer device for a P2P search or a connection request.

According to an embodiment of the disclosure, the message received from the peer device may include at least one of a group owner (GO) negotiation request message or an invitation request message.

According to an embodiment of the disclosure, the AP connection information and the BT connection information of the peer device may be acquired through a vender specific information element of the GO negotiation request message or the invitation request message.

According to an embodiment of the disclosure, the AP connection information of the electronic device may include information about whether the electronic device has been connected to the access point and information about a channel which the electronic device uses for the connection to the access point, and the AP connection information of the peer device may include information about whether the peer device has been connected to the access point and information about a channel which the peer device uses for the connection to the access point.

According to an embodiment of the disclosure, the processor may be further configured to execute the one or more instructions to determine the P2P operating channel further based on information about whether the electronic device supports dual simultaneous band (DSB) and information about whether the peer device supports real simultaneous dual band (RSDB).

According to an embodiment of the disclosure, an operating method of an electronic device includes: acquiring AP connection information of the electronic device about a wireless connection to an access point and BT connection information of the electronic device about a connection to a Bluetooth device; receiving, from a peer device attempting to establish a P2P connection to the electronic device, AP connection information of the peer device about a wireless connection to an access point; determining a P2P operating channel between the electronic device and the peer device based on the AP connection information and the BT connection information of the electronic device and the AP connection information of the peer device; and establishing a P2P connection between the electronic device and the peer device according to the determined P2P operating channel.

According to an embodiment of the disclosure, there is provided a computer program product including a computer-readable recording medium storing a program for performing an operating method of an electronic device, the operating method including: acquiring AP connection information of the electronic device about a wireless connection to an access point and BT connection information of the electronic device about a connection to a Bluetooth device; receiving, from a peer device attempting to establish a P2P connection to the electronic device, AP connection information of the peer device about a wireless connection to an access point; determining a P2P operating channel between the electronic device and the peer device based on the AP connection information and the BT connection information of the electronic device and the AP connection information of the peer device; and establishing a P2P connection between the electronic device and the peer device according to the determined P2P operating channel.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16 shows an operating channel setting in a case (case 1-2) in which a TV has been connected to an AP with a 5 GHz band and a peer has been connected to the AP with a 2.4 GHz band, according to an embodiment of the disclosure;

FIG. 18 shows an operating channel setting in a case (case 1-4) in which a TV and a peer have been connected to APs with different channels of 5 GHz, according to an embodiment of the disclosure;

FIG. 20 shows an operating channel setting in a case (case 2-1) in which both a TV and a peer have been connected to an AP with a 2.4 GHz band, according to an embodiment of the disclosure;

FIG. 22 shows an operating channel setting in a case (case 2-3) in which a TV has been connected to an AP with a 2.4 GHz band and a peer has been not connected to an AP, according to an embodiment of the disclosure;

DETAILED DESCRIPTION

Figure 1:
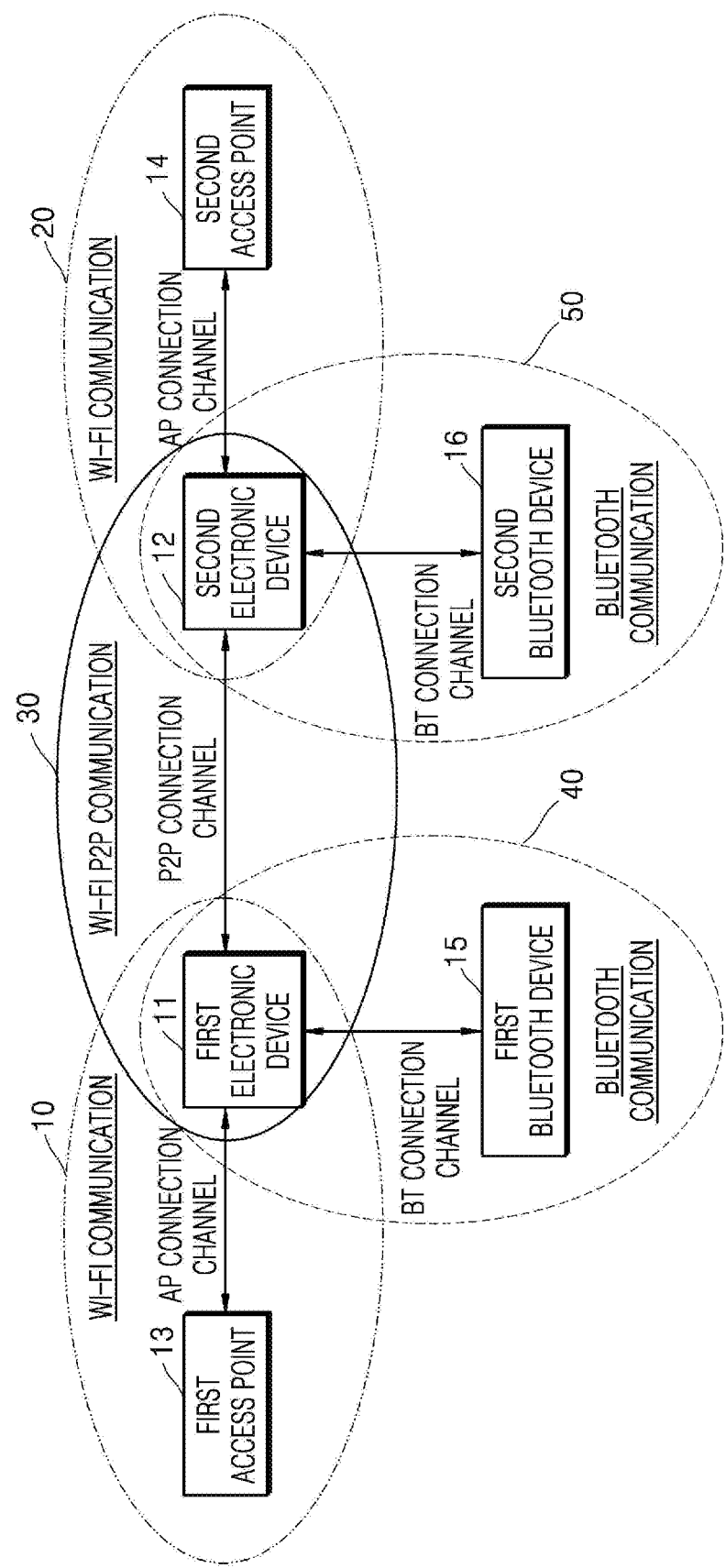
FIG. 1 shows an example of a system using various communication connections according to embodiments of the disclosure.

Terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It will be understood that when a certain part "includes" a certain component, the part does not exclude another component but can further include another component, unless the context clearly dictates otherwise. As used herein, the terms "portion", "module", or the like refers to a unit that can perform at least one function or operation, and may be implemented as hardware, software, or a combination of hardware and software.

Throughout the disclosure, the expression "at least one of a, b or c" indicates only a, only b, only c, both a and b, both a and c, both b and c, all of a, b, and c, or variations thereof.

Hereinafter, the embodiments of the disclosure will be described in detail with reference to the accompanying drawings such that one of ordinary skill in the technical field to which the disclosure belongs may easily embody the disclosure. However, the disclosure can be implemented in various different forms, and is not limited to the embodiments described herein. Also, in the drawings, portions irrelevant to the description are not shown in order to definitely describe the disclosure, and throughout the entire specification, similar components are assigned like reference numerals.

In the embodiments of the specification, the term "user" means a person who controls the functions or operations of an image display apparatus using a controller, and may include a viewer, a manager, or an installation engineer.

FIG. 1 shows an example of a system where various communication connections to which embodiments of the disclosure are applied coexist.

Referring to FIG. 1, a system may include a first electronic device 11, a second electronic device 12, a first access point 13, a second access point 14, a first Bluetooth device 15, and a second Bluetooth device 16.

The first electronic device 11 may be connected to the first access point 13 through Wi-Fi communication 10, and the second electronic device 12 may be connected to the second access point 14 through Wi-Fi communication 20.

The first access point 13 and the second access point 14 may be the same access point or different access points.

Wi-Fi, which is an abbreviation of wireless fidelity (wireless data transfer system), is technology that enables devices to connect to the wireless broadband internet through a local area network without a private line or a telephone line. Wi-Fi communication is communication between an access point (AP) basically functioning to transfer wireless signals and a terminal such as a smart phone to provide a user with a service. The Wi-Fi communication uses a frequency band of 2.4 GHz/5 GHz.

The first electronic device 11 may be connected to the first Bluetooth device 15 through Bluetooth communication 40, and the second electronic device 12 may be connected to the second Bluetooth device 16 through Bluetooth communication 50.

The first Bluetooth device 15 and the second Bluetooth device 16 may be the same Bluetooth device or different Bluetooth devices.

Bluetooth communication is based on a short-range wireless technology standard that connects portable devices, such as TVs, mobile phones, laptop computers, earphones, headphones, speakers, etc., to each other to exchange information. The Bluetooth communication is used when a low-power wireless connection is needed in a very short range of plus or minus 10 meters. A Bluetooth wireless system uses 2.4 GHz which is an industrial scientific medical (ISM) frequency band. Because Bluetooth communication shares the same frequency band with different systems, system interference may occur. To prevent such system interference, Bluetooth adopts a frequency hopping method. The frequency hopping method is technology of moving a large number of channels rapidly according to a predetermined pattern to transfer packets (data) little by little. Bluetooth hops assigned 79 channels 1600 times per second.

For example, wireless connections between various smart devices (for example, a smart phone, a TV, a printer, a tablet PC, etc.) and various accessories (for example, an earphone/headphone, an external speaker, a keyboard/mouse, etc.) may be possible. Particularly, Bluetooth communication is mainly used for audio data transfer for outputting sound to an outside in a wireless fashion by connecting a smart TV with an external speaker with BT.

The first electronic device 11 may be connected to the second electronic device 12 by Wi-Fi P2P communication 30.

Wi-Fi P2P communication is also referred to as P2P communication. Wi-Fi P2P technology is mounted on an electronic device or a portable device to provide a base for using device-to-device content and services through direct communication between terminals without separate equipment, such as an AP or a router. P2P devices on a Wi-Fi P2P network may be connected directly to each other.

Wi-Fi Direct is Wi-Fi based technology defined and authenticated as a standard in the Wi-Fi Alliance, and provides a P2P protocol connection method for direct communication between terminals without network infrastructure equipment, such as an AP or a router.

A user connects his/her device directly to another device on a network through the Wi-Fi Direct to use a desired service, instead of first connecting his/her device to an AP and then connecting it to the other device on the network. Lately, the Wi-Fi Direct is mounted on various devices, such as TVs, laptop computers, cameras, printers, and game machines, as well as smart phones, to transmit or share content, such as pictures, video, games, etc., through direct connections between terminals.

A P2P operating channel that will be used for a Wi-Fi Direct connection is determined when a P2P group is created, and generally, a device that will perform a group owner (GO) role selects an operating channel. Wireless network performance (throughput, packet loss, etc.) depends on a P2P operating channel setting upon a P2P connection, and accordingly, optimal channels need to be set according to scenarios for efficient use of wireless bandwidths. However, referring to FIG. 1, the first electronic device 11 and the second electronic device 12 may be respectively connected to APs, and also, may be respectively connected to Bluetooth devices. Accordingly, to set an optimal channel, whether there is an AP connection, whether there is a Bluetooth connection, etc. may need to be at least considered.

Figure 2:
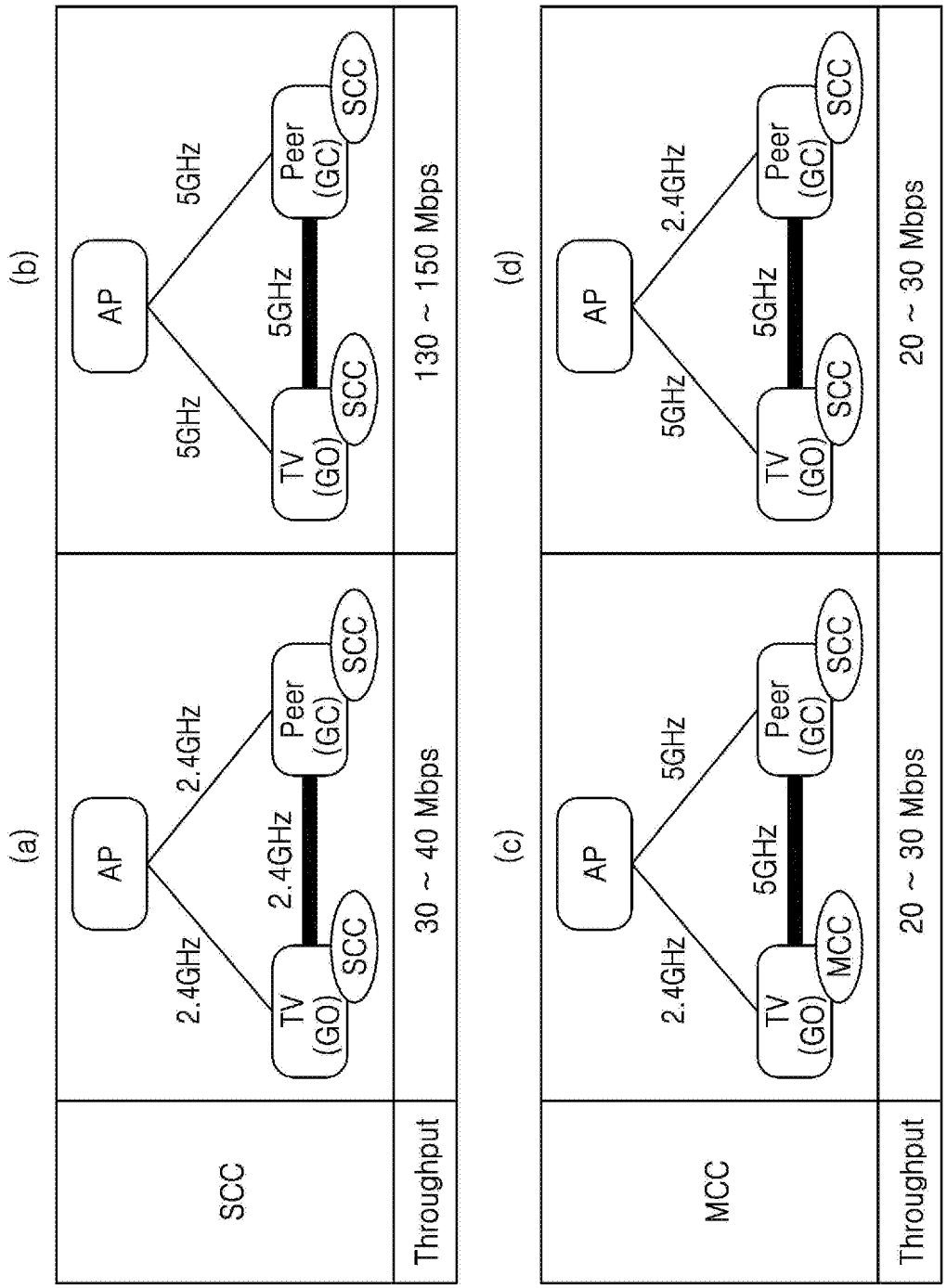
FIG. 2 is a view for explaining single channel concurrency (SCC) and multi channel concurrency (MCC)

FIG. 2 is a view for explaining concepts of single channel concurrency (SCC) and multi channel concurrency (MCC).

Applications, such as Miracast and device-to-device file transfer, are representative Wi-Fi Direct based application services, and provide a seamless service when a sufficient wireless bandwidth is secured. An operation most influencing wireless network performance during a Wi-Fi Direct connection process is an operation of setting an operating channel in a GO. Setting an operating channel to a 5 GHz band having relatively small interference is more advantageous in view of Wi-Fi Direct connection performance than setting an operating channel to a 2.4 GHz band.

SCC refers to a case in which a channel with which a device has been connected to an AP is identical to a P2P channel.

Referring to (a) of FIG. 2, a 2.4 GHz band is used between a TV and an AP, between a peer and the AP, and between the TV and the peer. The TV uses 2.4 GHz as an AP connection channel and a P2P connection channel, and also, the peer uses 2.4 GHz as an AP connection channel and a P2P connection channel. Therefore, SCC is satisfied. According to an experimental example, in (a) of FIG. 2, throughput may be 30 Mbps to 40 Mbps.

Referring to (b) of FIG. 2, a 5 GHz band is used between a TV and an AP, between a peer and the AP, and between the TV and the peer. The TV uses 5 GHz as an AP connection channel and a P2P connection channel, and also, the peer uses 5 GHz as an AP connection channel and a P2P connection channel. Therefore, SCC is satisfied. According to an experimental example, in (b) of FIG. 2, throughput may be 130 Mbps to 150 Mbps. As such, both (a) and (b) of FIG. 2 satisfy SCC. However, setting the 5 GHz band having relatively smaller interference than the 2.4 GHz band may increase throughput, thereby improving Wi-Fi Direct connection performance.

MCC refers to a case in which a channel with which a device has been connected to an AP is different from a P2P channel. When at least one of devices connected through Wi-Fi Direct functions as a concurrent connection device, that is, when a band for an AP connection is different from a band for a P2P connection, MCC may occur, and a great wireless network performance difference may be generated according to an operating channel setting. For example, when a new Wi-Fi Direct connection is additionally established in an operating channel of a 5 GHz band in the state in which a connection to an AP using a channel of a 2.4 GHz band is maintained, the corresponding device may function as a concurrent connection device so that MCC may occur.

Referring to (c) of FIG. 2, a 2.4 GHz band may be used between a TV and an AP, and a 5 GHz band may be used between a peer and the AP and between the TV and the peer. The TV uses 2.4 GHz as an AP connection channel and 5 GHz as a P2P connection channel so that MCC occurs, and the peer uses 5 GHz as an AP connection channel and a P2P connection channel so that SCC is satisfied. However, when MCC occurs in any one of the TV and the peer which are Wi-Fi P2P connection devices, wireless network performance may deteriorate sharply. According to an experimental example, in (c) of FIG. 2, throughput may be 20 Mbps to 30 Mbps.

Referring to (d) of FIG. 2, a 5 GHz band may be used between a TV and an AP, and a 2.4 GHz band may be used between a peer and the AP. The TV uses 5 GHz as an AP connection channel and a P2P connection channel so that SCC is satisfied, whereas the peer uses 2.4 GHz as an AP connection channel and 5 GHz as a P2P connection channel so that MCC occurs. When MCC occurs in any one of Wi-Fi P2P connection devices, like (c) of FIG. 2, wireless network performance may deteriorate sharply. According to an experimental example, in (d) of FIG. 2, throughput may be 20 Mbps to 30 Mbps.

When MCC occurs in any one device, it may be needed to operate different Wi-Fi channels at the same time by a time division method. Therefore, wireless network performance with respect to the SCC environment may deteriorate sharply. Accordingly, for Wi-Fi connection performance, generation of MCC may need to be avoided, and when MCC avoidance is inevitable in a concurrent connection situation, etc., setting an operating channel to a 5 GHz band instead of a 2.4 GHz band may reduce P2P performance deterioration.

Figure 3:
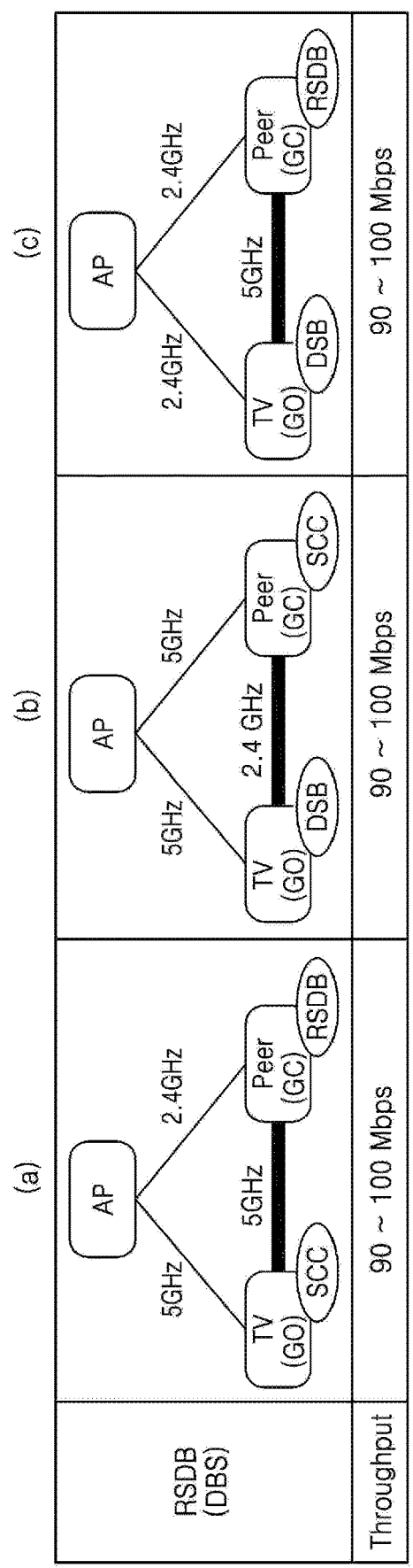
FIG. 3 is a view for explaining real simultaneous dual band (RSDB)

FIG. 3 is a view for explaining a concept of a real simultaneous dual band (RSDB).

RSDB or dual band simultaneous (DBS) technology is technology to enable a concurrent connection to and transmission/reception to/from dual bands, for example, different frequency bands (5 GHz and 2.4 GHz) in a Wi-Fi module supporting multiple input multiple output (MIMO). That is, in a Wi-Fi module supporting MIMO, by assigning, when an AP connection channel and a P2P channel use different bands, 1×1 to the AP connection channel and 1×1 to the P2P channel from 2×2 MIMO, concurrent connections between the different bands (2.4 GHz/5 GHz) may be possible by physical antenna separation to prevent generation of MCC.

Referring to (a) of FIG. 3, a TV uses 5 GHz for an AP connection and a P2P connection, which corresponds to SCC, and a peer uses 2.4 GHz and 5 GHz for an AP connection and a P2P connection, respectively, which corresponds to a situation in which MCC will occur. However, because the peer supports RSDB, generation of MCC may be avoided. Accordingly, throughput may be 90 Mbps to 100 Mbps according to an experimental example.

Referring to (b) of FIG. 3, a peer uses 5 GHz for an AP connection and a P2P connection, which corresponds to SCC, and a TV uses 2.4 GHz and 5 GHz for an AP connection and a P2P connection, respectively, which corresponds to a situation in which MCC will occur. However, because the TV supports DBS, generation of MCC may be avoided. Accordingly, throughput may be 90 Mbps to 100 Mbps according to an experimental example.

Referring to (c) of FIG. 3, a TV uses 2.4 GHz and 5 GHz for an AP connection and a P2P connection, respectively, and a peer also uses 2.4 GHz and 5 GHz for an AP connection and a P2P connection, respectively, which corresponds to a situation in which MCC will occur. However, because both the TV and the peer support DBS and RSDB, respectively, generation of MCC may be avoided. Accordingly, throughput may be 90 Mbps to 100 Mbps according to an experimental example.

Particularly, when a device is connected to another device supporting RSDB through Wi-Fi Direct, concurrent connections to 5 GHz and 2.4 GHz bands may be possible. Therefore, an optimal channel may be set in consideration of a P2P operation channel setting according to an AP channel connected to the counterpart device and whether the counterpart device supports RSDB.

To reduce P2P performance deterioration, the device may set an optimal P2P operating channel by using information about whether the device and the counterpart device have been connected to an AP, channel information of the connected AP, and information about whether the devices support RSDB. Particularly, when two devices attempting to establish a Wi-Fi Direct connection support RSDB, concurrent connections to different frequency bands may be possible, so that a MCC scenario may be avoided.

Figure 4:
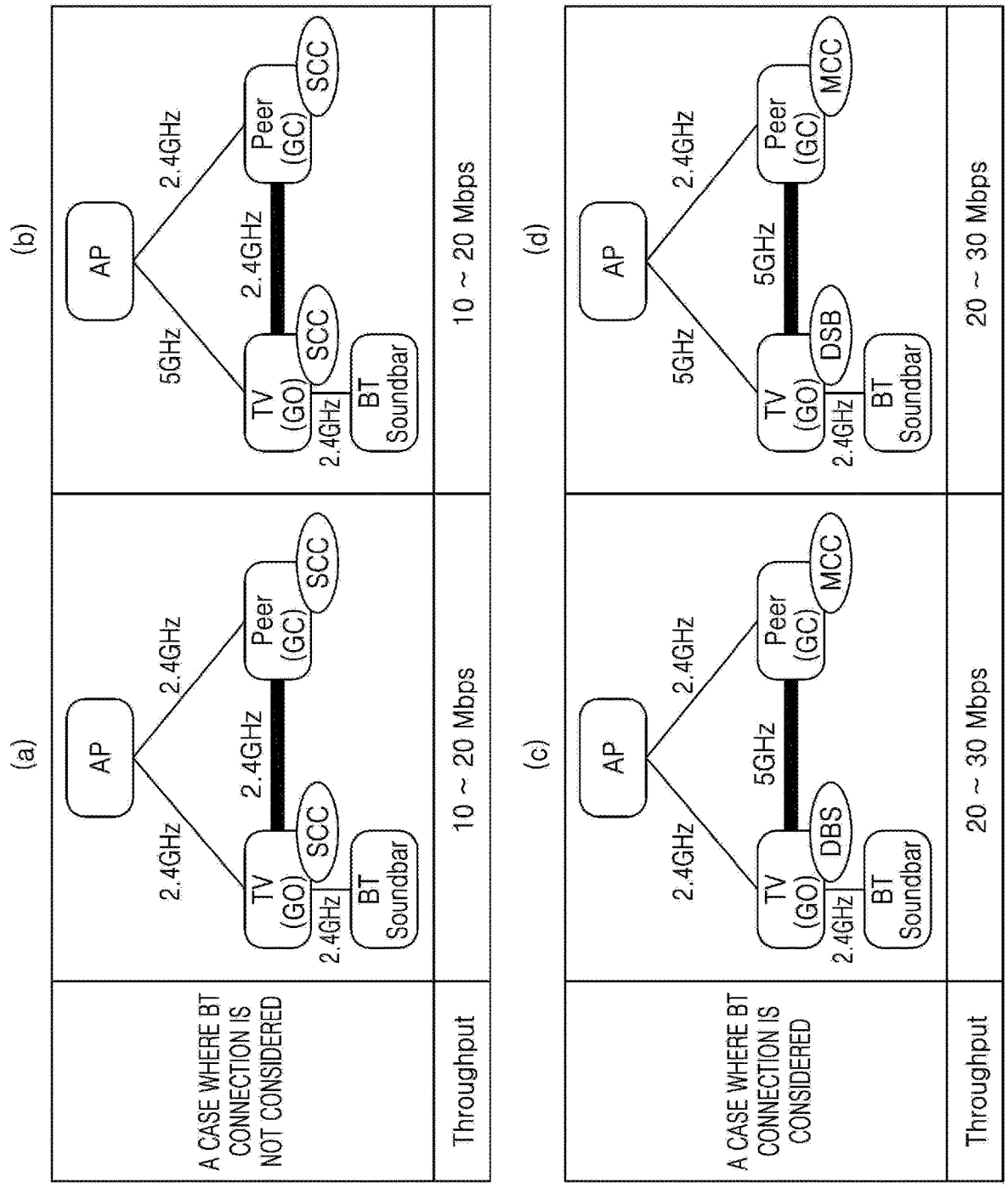
FIG. 4 show examples of a case of considering a Bluetooth device and a case of not considering a Bluetooth device when a peer-to-peer (P2P) operating channel is determined according to embodiments of the disclosure.

FIG. 4 shows examples of a case of considering a Bluetooth device and a case of not considering a Bluetooth device when a P2P operating channel is determined according to embodiments of the disclosure.

As described above with reference to FIG. 3, to reduce wireless network performance deterioration when a device-to-device Wi-Fi Direct connection is established, an optimal P2P operating channel may be set according to an AP connection scenario and whether RSDB is supported. Particularly, by exchanging information about whether RSDB allowing concurrent connections to different frequency bands is supported, generation of MCC may be reduced. When generation of MCC is inevitable, an operating channel may be set to an available 5 GHz band to secure a wireless bandwidth and prevent quality deterioration of an application service.

Meanwhile, when a P2P operating channel is set, a connection of a BT device may be further considered. BT uses the same frequency band of 2.4 GHz as Wi-Fi. Therefore, when a smart phone and a smart TV device supporting both BT and Wi-Fi operate both BT and a Wi-Fi Direct channel of a 2.4 GHz band, wireless interference may occur so that both BT performance and Wi-Fi performance deteriorate. Particularly, when a smart TV connects to an external speaker with BT to provide a service that is sensitive to wireless quality, such as an audio data transfer scenario for outputting sound to an outside wirelessly, the BT and Wi-Fi Direct channel of the 2.4 GHz band may operate simultaneously, and in this case, a sufficient bandwidth may be not secured due to wireless interference, so that a probability of audio cutting may increase.

(a) and (b) of FIG. 4 show examples of not considering whether there is a BT connection when a Wi-Fi P2P operating channel is set.

Referring to (a) of FIG. 4, a 2.4 GHz band is used between a TV and an AP and between a peer and the AP. Therefore, 2.4 GHz may be determined when a P2P operating channel between the TV and the peer is set, such that both the TV and the peer satisfy SCC regardless of whether or not the TV or the peer has been connected to BT. However, because the TV has been connected to a BT device, the 2.4 GHz band may also be used between the TV and the BT device. Because the TV uses the 2.4 GHz band for Wi-Fi P2P communication with the peer and for Bluetooth communication with the BT device, a large amount of wireless interference may occur so that both BT performance and Wi-Fi performance may deteriorate. Accordingly, in the case (a) of FIG. 4, throughput may be lowered to 10 Mbps to 20 Mbps according to an experimental example.

Referring to (b) of FIG. 4, because a 5 GHz band is used between a TV and an AP, a 2.4 GHz band is used between a peer and the AP, and the TV supports DBS, a P2P operating channel between the TV and the peer may be determined as 2.4 GHz. In this case, because the TV supports DBS although it uses different channels for an AP connection and a P2P connection, MCC issue will not occur. Also, because the peer uses the same channel for an AP connection and a P2P connection, it satisfies SCC.

However, because a BT device has been connected to the TV, the 2.4 GHz band may also be used between the TV and the BT device. Because the TV uses the 2.4 GHz band for Wi-Fi P2P communication with the peer and for Bluetooth communication with the BT device, a large amount of wireless interference may be generated so that both BT performance and Wi-Fi performance may deteriorate. Accordingly, in (b) of FIG. 4, throughput may be lowered to 10 Mbps to 20 Mbps according to an experimental example.

(c) and (d) of FIG. 4 show examples of considering whether there is a BT connection when a Wi-Fi P2P operating channel is set.

Referring to (c) of FIG. 4, a 2.4 GHz band may be used between a TV and a peer and between the peer and an AP, and the TV may also be connected to a BT device with the 2.4 GHz band. In this case, when a P2P operating channel between the TV and the peer is determined, a 5 GHz band, instead of the 2.4 GHz band used for BT communication, may be used in consideration that the TV has been connected to the BT device. When 5 GHz is used for a P2P connection, the peer may use different channels as an AP connection channel and a P2P connection channel so that MCC may be generated. However, because performance deterioration generated when the TV uses the same band for a BT connection and a P2P connection is greater than performance deterioration caused by generation of MCC in the peer, whether there is a BT connection may be preferentially considered. In (c) of FIG. 4, throughput may be 20 Mbps to 30 Mbps according to an experimental example, and therefore, performance may be more improved than in (a) of FIG. 4 in which whether there is a BT connection is not considered.

Referring to (d) of FIG. 4, a 5 GHz band is used between a TV and a peer, a 2.4 GHz band is used between the peer and an AP, and the TV has been connected to a BT device with the 2.4 GHz band for Bluetooth communication. In this case, when a P2P operating channel between the TV and the peer is determined, the 5 GHz band, instead of the 2.4 GHz band used for BT communication, may be used in consideration that the TV has been connected to the BT device. When 5 GHz is used for a P2P connection, the peer uses different channels as an AP connection channel and a P2P connection channel so that MCC may be generated. However, because performance deterioration generated when the TV uses the same band for a BT connection and a P2P connection is greater than performance deterioration caused by generation of MCC in the peer, whether there is a BT connection may be preferentially considered. In (d) of FIG. 4, throughput may be 20 Mbps to 30 Mbps according to an experimental example, and therefore, performance may be more improved than in (b) of FIG. 4 in which whether there is a BT connection is not considered.

Accordingly, the embodiments disclosed in the specification may propose a method for increasing wireless performance by in advance determining whether there is a BT connection when a Wi-Fi Direct connection is established to set a P2P operating channel of a 5 GHz band when a device supporting RSDB operates BT simultaneously.

Figure 5:
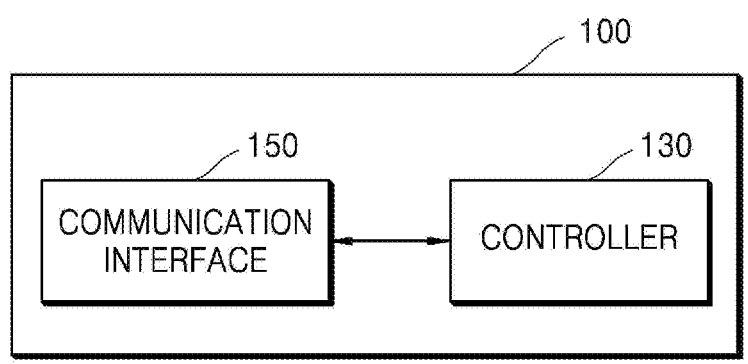
FIG. 5 is a schematic block diagram of an electronic device according to an embodiment of the disclosure.

FIG. 5 is a schematic block diagram of an electronic device 100 according to an embodiment of the disclosure.

Referring to FIG. 5, the electronic device 100 may include a controller 130 and a communication interface 150.

The communication interface 150 may include a plurality of communication modules to establish a Wi-Fi wireless connection to an AP, to communicate with a BT device, or to perform Wi-Fi P2P communication with a peer device.

The controller 130 may include one or more processors to control the communication interface 150.

According to an embodiment of the disclosure, the controller 130 may acquire AP connection information for a wireless connection between the electronic device 100 and an AP and BT connection information for a connection between the electronic device 100 and a BT device, receive, from a peer device attempting to establish a P2P connection to the electronic device 100, AP connection information for a wireless connection between the peer device and the AP, determine a P2P operating channel between the electronic device 100 and the peer device based on the AP connection information and the BT connection information of the electronic device 100 and the AP connection information of the peer device, and establish a P2P connection between the electronic device 100 and the peer device according to the determined P2P operating channel.

According to the operation of the controller 130, when an operating channel for a P2P connection is determined, an optimal operating channel may be determined in consideration of information about whether the electronic device 100 has been connected to BT, the information greatly influencing bandwidth performance of the electronic device 100. According to an example, by considering information about whether there is a BT connection to prevent use of the same channel as the BT connection channel when an operating channel for a P2P connection of the electronic device 100 is determined, performance deterioration caused when the same channel is used for a BT connection and a P2P connection may be reduced.

According to an embodiment of the disclosure, the controller 130 may determine that the electronic device 100 has been connected to the BT device, based on the BT connection information, and determine a P2P operating channel in consideration of the BT connection information prior to the AP connection information of the electronic device 100 and the AP connection information of the peer device, according to the determination.

According to the operation of the controller 130, by preferentially considering whether there is a BT connection, which more influences communication performance deterioration of the electronic device 100, an optimal operating channel may be determined.

According to an embodiment of the disclosure, the controller 130 may determine a channel not overlapping with a channel used by the electronic device 100 for a connection to Bluetooth, as the P2P operating channel, in consideration of the BT connection information of the electronic device 100.

According to the operation of the controller 130, by determining a P2P operating channel not overlapping with a channel used for a connection to Bluetooth to be not influenced by the Bluetooth connection channel, a reduction of throughput of a P2P operation may be prevented.

According to an embodiment of the disclosure, when the electronic device 100 is connected to an AP of a 5 GHz band in the state of being connected to a BT device, the controller 130 may determine a 5 GHz AP channel connected to the electronic device 100, as a P2P operating channel.

According to an embodiment of the disclosure, when the electronic device 100 is connected to an AP of a 2.4 GHz band in the state of being connected to a BT device, the controller 130 may determine a basic 5 GHz preference channel set by the electronic device 100 or a 5 GHz channel preferred by the peer device, as a P2P operating channel.

According to an embodiment of the disclosure, when the peer device has not been connected to an AP, the controller 130 may determine a basic 5 GHz preference channel set by the electronic device 100 or a 5 GHz channel preferred by the peer device, as a P2P operating channel.

According to an embodiment of the disclosure, the controller 130 may further receive BT connection information of the peer device about a connection between the peer device and a BT device from the peer device, and determine a P2P operating channel further based on the BT connection information of the peer device.

According to the operation of the controller 130, by further considering information about whether the peer device has been connected to BT as well as information about whether the electronic device 100 has been connected to BT when an operating channel for a P2P connection is determined, an optimal operating channel may be determined.

According to an embodiment of the disclosure, the controller 130 may acquire AP connection information and BT connection information of the peer device from a message received from the peer device for a P2P search or a connection request.

According to an embodiment of the disclosure, the message received from the peer device may include at least one of a GO negotiation request message or an invitation request message.

According to an embodiment of the disclosure, the AP connection information and BT connection information of the peer device may be acquired through a vender specific information element of the GO negotiation request message or the invitation request message.

According to an embodiment of the disclosure, the AP connection information of the electronic device 100 may include information about whether the electronic device 100 has been connected to the AP and information about a channel used when the electronic device 100 has been connected to the AP, and the AP connection information of the peer device may include information about whether the peer device has been connected to the AP and information about a channel used when the peer device has been connected to the AP.

According to an embodiment of the disclosure, when the P2P operating channel is determined, the controller 130 may determine the P2P operating channel further based on whether the electronic device supports DSB and whether the peer device supports RSDB.

Figure 6:
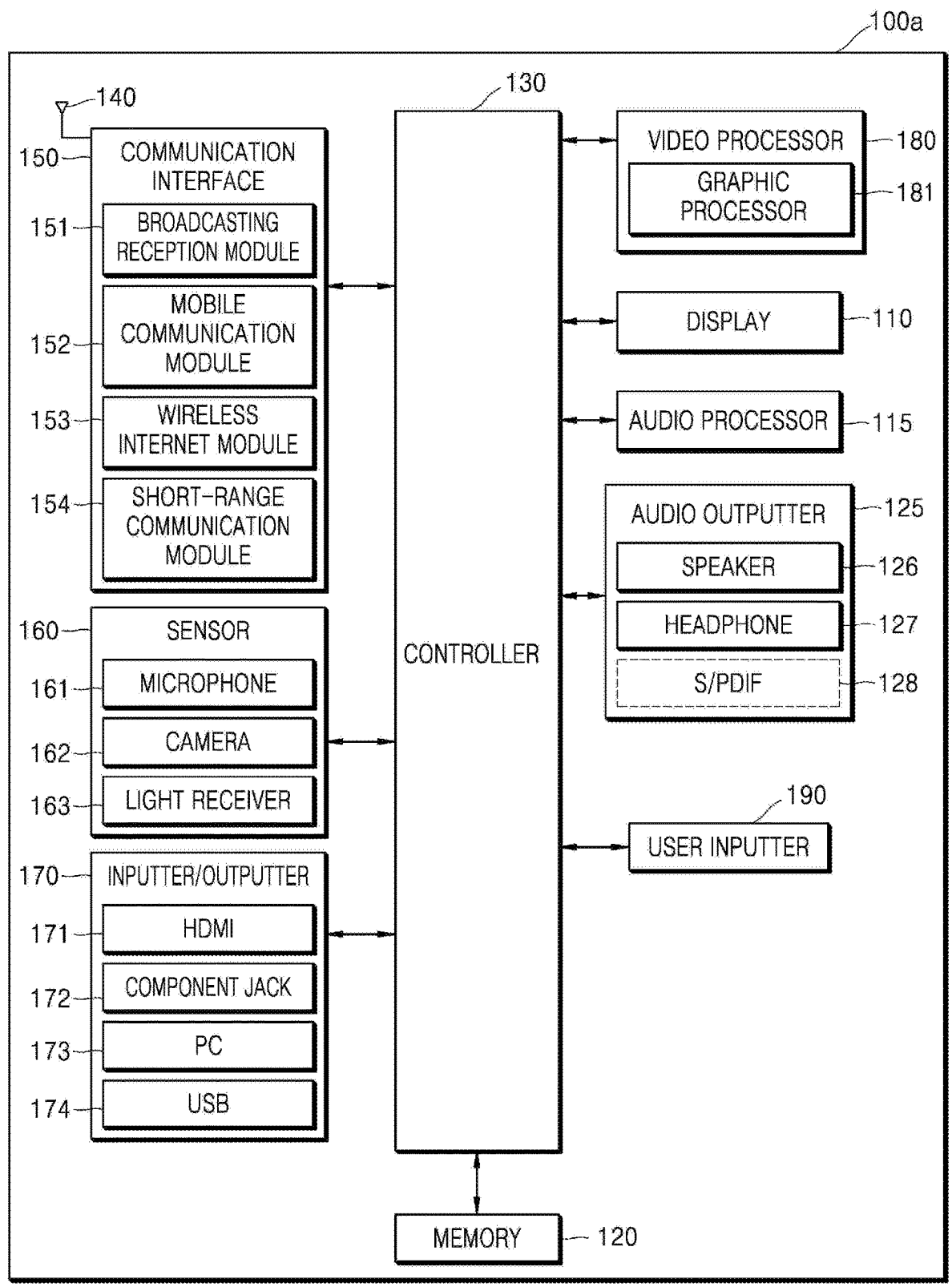
FIG. 6 is a block diagram showing a detailed configuration of the electronic device shown in FIG. 5 according to an embodiment of the disclosure.

FIG. 6 is a block diagram showing a detailed configuration of the electronic device 100 shown in FIG. 5.

Referring to FIG. 6, an electronic device 100a according to an embodiment of the disclosure may include a display 110, a memory 120, an audio processor 115, an audio outputter 125, the controller 130, a transmission/reception antenna 140, a wireless communication device 150, a sensor 160, and an inputter/outputter 170, and may further include a video processor 180 and a user inputter 190.

The same content as that described above with reference to FIG. 5 will be omitted in the following description given below with reference to FIG. 6.

The video processor 180 may perform processing on video data received by the electronic device 100a. The video processor 180 may perform various image processing, such as decoding, scaling, noise filtering, frame rate conversion, resolution conversion, etc., on the video data. The graphic processor 181 may create a screen including various objects, such as an icon, an image, text, etc., by using an operator (not shown) and a render (not shown).

The display 110 may output video included in a broadcasting signal, content (for example, a moving image) received through the wireless communication device 150 or the inputter/outputter 170, or an image stored in the memory 120 by a control of the controller 130.

The display 110 may convert an image signal, a data signal, an OSD signal, a control signal, etc. processed by the controller 130 to generate a driving signal. The display 110 may be implemented as a PDP, a LCD, an OLED, a flexible display, etc., and also may be implemented as a 3 Dimensional (3D) display. Also, the display 110 may be configured as a touch screen to be used as an input device, as well as an output device.

The audio processor 115 may perform processing on audio data. The audio processor 115 may perform various processing, such as decoding, amplification, noise filtering, on the audio data. Meanwhile, the audio processor 115 may include a plurality of audio processing modules to process audio corresponding to a plurality of content.

The audio outputter 125 may output audio included in a broadcasting signal received by a control of the controller 130. The audio outputter 125 may output audio (for example, voice or sound) received through the wireless communication device 150 or the inputter/outputter 170. Also, the audio outputter 125 may output audio stored in a storage device (not shown) by a control of the controller 130. The audio outputter 125 may include at least one or a combination of a speaker 126, a headphone output terminal 127, or Sony/Philips Digital Interface (S/PDIF; output terminal 128).

The transmission/reception antenna 140 may function to receive signals transmitted from other devices or to transmit signals to the other devices. A single transmission/reception antenna 140 is shown, however, a plurality of antennas may be provided. Accordingly, the electronic device 100 according to the disclosure may support a MIMO system. In a Wi-Fi module supporting MIMO, by assigning, when an AP-connected channel and a P2P channel use different bands, 1×1 to the AP-connected channel and 1×1 to the P2P channel from 2×2 MIMO, concurrent connections between the different bands (2.4 GHz/5 GHz) may be possible by physical antenna separation to prevent generation of MCC.

The wireless communication device 150 may include one or more modules to enable wireless communications between the electronic device 100a and the wireless communication system or between the electronic device 100a and a network on which another electronic device is located. For example, the wireless communication device 150 may include a broadcasting reception module 151, a mobile communication module 152, a wireless internet module 153, and a short-range communication module 154. The wireless communication device 150 is also referred to as a transmitter/receiver.

The broadcasting reception module 151 may receive a broadcasting signal and/or broadcasting-related information from an external broadcasting management server through a broadcasting channel. The broadcasting signal may include a TV broadcasting signal, a radio broadcasting signal, and a data broadcasting signal, and may also include a broadcasting signal in which a data broadcasting signal is combined with a TV broadcasting signal or a radio broadcasting signal.

The mobile communication module 152 may transmit/receive a wireless signal to/from at least one of a base station, an external terminal or a server on a mobile communication network. The wireless signal may include various formats of data according to transmission/reception of a voice call signal, a video call signal or a text/multimedia message.

The wireless internet module 153 may be a module for wireless internet connections, and installed inside or outside the electronic device 100a. As wireless internet technology, wireless LAN (WLAN), Wireless-Fidelity (Wi-Fi), World Interoperability for Microwave Access (Wimax), High Speed Downlink Packet Access (HSDPA), etc. may be used. Through the wireless internet module 153, the electronic device 100a may establish a Wi-Fi P2P connection to another device. Through a Wi-Fi P2P connection, a device-to-device streaming service may be provided, and also, a data transmission/reception service or a printing service when the electronic device 100a is connected to a printer may be provided.

The short-range communication module 154 may be a module for short-range communication. As short-range communication technology, Bluetooth, Radio Frequency Identification (RFID), Infrared Data Association (IrDA), Ultra Wideband (UWB), Zigbee, etc. may be used.

The sensor 160 may sense a user's voice, a user's image or a user's interaction, and may include a microphone 161, a camera 162, and a light receiver 163.

The microphone 161 may receive a voice uttered by a user. The microphone 161 may convert the received voice into an electrical signal and output the electrical signal to the controller 130. The user's voice may include, for example, a voice corresponding to a menu or function of the electronic device 100a.

The camera 162 may receive an image (for example, successive frames) corresponding to a user's motion including a gesture in a camera recognition range. The controller 130 may select a menu displayed on the electronic device 100a by using a recognition result of the received motion or perform a control corresponding to the recognition result of the motion.

The light receiver 163 may receive an optical signal (including a control signal) transmitted from an external remote controller.

The inputter/outputter 170 may receive video (for example, a moving image, etc.), audio (for example, a voice, music, etc.), and additional information (for example, EPG, etc.) from an outside of the electronic device 100a by a control of the controller 130. The inputter/outputter 170 may include one of a high-definition multimedia interface (HDMI) port 171, a component jack 172, a PC port 173, and a USB port 174. The inputter/outputter 170 may include a combination of the HDMI port 171, the component jack 172, the PC port 173, and the USB port 174.

The memory 120 may store various data, programs, or applications for driving and controlling the electronic device 100a by a control of the controller 130. The memory 120 may store signals or data that are input/output to correspond to driving of the video processor 180, the display 110, the audio processor 115, the audio outputter 125, the antenna 140, the communication device 150, the sensor 160, and the inputter/outputter 170.

The memory 120 may store an operating system for a control of the electronic device 100a and the controller 130, an application initially provided from a manufacturing company or downloaded from an outside, an graphic user interface (GUI) related to the application, an object (for example, image text, an icon, a button, etc.) for providing the GUI, user information, text, database, or related data.

The memory 120 may include read only memory (ROM), random access memory (RAM), or a memory card (for example, a micro SD card or a USB memory (not shown)) installed in the electronic device 100a. Also, the memory 120 may include a non-volatile memory, a volatile memory, a hard disk drive (HDD), or a solid state drive (SSD).

According to an embodiment of the disclosure, the memory 120 may include one or more instructions for determining whether the electronic device 100a has been connected to an AP, one or more instructions for checking a basic preference channel of the electronic device 100a, one or more instructions for determining whether the electronic device 100a supports RSDB, and one or more instructions for determining whether the electronic device 100 has been connected to BT.

Also, according to an embodiment of the disclosure, the memory 120 may include one or more instructions for acquiring AP connection information, AP channel information, and BT connection information of a peer device being the other party for a P2P connection and information about whether the peer device supports RSDB.

Also, according to an embodiment of the disclosure, the memory 120 may include one or more instructions for determining a P2P operating channel, based on AP connection information, BT connection information, and a basic preference channel of the electronic device 100a, information about whether the electronic device 100 supports RSDB, AP connection information, AP channel information, and BT connection information of the counterpart electronic device, and information about whether the counterpart electronic device supports RSDB.

Also, according to an embodiment of the disclosure, the memory 120 may include one or more instructions for transmitting information about the determined operating channel to the peer device and performing a P2P wireless operation between the electronic device and the peer device according to the determined P2P operating channel.

The controller 130 may control overall operations of the electronic device 100a and signal flow between internal components of the electronic device 100a, and perform a function of processing data. When a user's input is received or when a pre-set, stored condition is satisfied, the controller 130 may execute OS and various applications stored in the memory 120.

The controller 130 may include RAM that stores signals or data received from an outside of the electronic device 100a or is used as a storage area corresponding to various tasks performed by the electronic device 100a, ROM storing a control program for controlling the electronic device 100a, and a processor.

According to an embodiment of the disclosure, the controller 130 may execute one or more instructions stored in the memory 120 to optimally determine a P2P operating channel.

Also, the processor may include a plurality of processors. For example, the processor may be implemented with a main processor (not shown) and a sub processor (not shown) operating in a sleep mode. The controller 130 is also referred to as a controller, a micro controller, or a microprocessor, and the controller 130 may be implemented by hardware, firmware, software, or a combination thereof.

Meanwhile, the block diagram of the electronic device 100a may be a block diagram according to an embodiment of the disclosure. Individual components of the block diagram may be integrated, other components may be added, or some of the components may be omitted, according to a specification of the electronic device 100a that are actually implemented. That is, two or more components may be integrated into a single component or a single component may be divided into two or more components, as necessary. Also, functions performed by individual blocks are provided to describe embodiments of the disclosure, and detailed operations or devices will not limit the scope of the disclosure.

Figure 7:
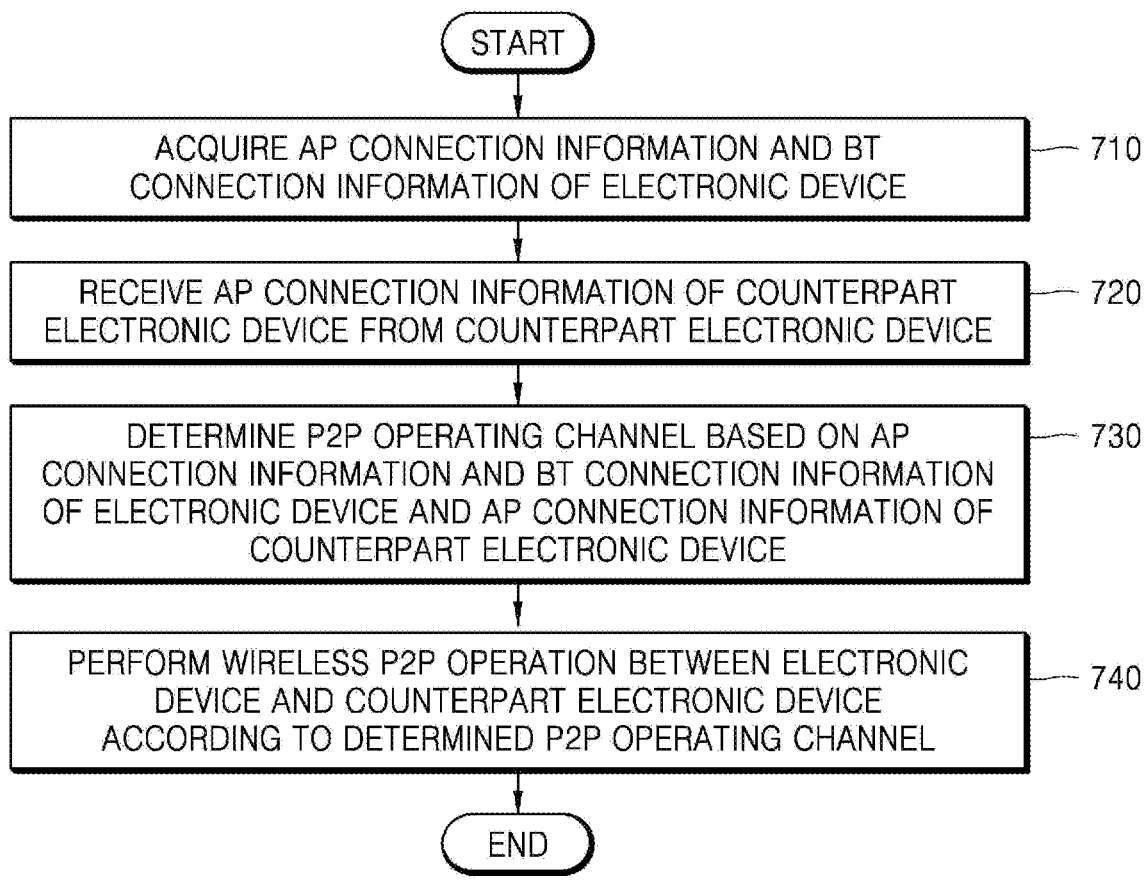
FIG. 7 is a flowchart showing a process of a method of determining a P2P operating channel according to an embodiment of the disclosure.

FIG. 7 is a flowchart showing a process of a P2P operating channel determining method according to an embodiment of the disclosure.

Referring to FIG. 7, in operation 710, an electronic device may acquire AP connection information and BT connection information of the electronic device.

The AP connection information of the electronic device may be information representing whether or not the electronic device has been connected to an AP, and the BT connection information of the electronic device may be information representing whether or not the electronic device has been connected to a BT device. According to an example, when a P2P connection request is sensed, the electronic device may inquire of a wireless communication module of the electronic device to check AP connection information, and inquire of a BT communication module to acquire BT connection information. Also, according to another example, the electronic device may store AP connection information and BT connection information at regular time intervals in a predetermined memory space. Also, according to another example, the electronic device may store AP connection information and BT connection information in a predetermined memory space whenever an AP connection is updated and whenever a BT connection is updated. For example, when a connection to a BT device starts, the electronic device may store information representing that the electronic device has been connected to the BT device in a predetermined memory space.

In operation 720, the electronic device may receive AP connection information of the counterpart electronic device from the counterpart electronic device.

The electronic device may receive a message including AP connection information of the counterpart electronic device from the counterpart electronic device during an operation of establishing a P2P connection to the counterpart electronic device, and parse the message to acquire the AP connection information of the counterpart electronic device. Herein, the AP to which the counterpart electronic device has been connected may be identical to or different from the AP to which the electronic device has been connected.

In operation 730, the electronic device may determine a P2P operating channel based on the AP connection information and BT connection information of the electronic device and the AP connection information of the counterpart electronic device.

In P2P communication, an operation of determining an operating channel may be performed by a group owner device, and an electronic device determined as a group owner may determine a P2P operating channel based on the AP connection information and BT connection information of the electronic device and the AP connection information of the counterpart electronic device.

When the electronic device determines a P2P operating channel, the electronic device may consider the AP connection information of the electronic device and the AP connection information of the counterpart electronic device. A basic concept is to determine a P2P operating channel such that no MCC occurs in the electronic device and the counterpart electronic device.

Also, when the electronic device determines a P2P operating channel, the electronic device may consider the BT connection information of the electronic device. When the electronic device is already using 2.4 GHz for a connection to a Bluetooth device, it will be preferable that the electronic device does not use the 2.4 GHz band in duplicate for a P2P connection.

However, because performance loss caused by use of the same band as that used for a Bluetooth connection is generally greater than performance loss caused by generation of MCC, the electronic device may consider BT connection information prior to AP connection information of the electronic device or the counterpart electronic device. That is, the electronic device may determine a P2P operating channel by preferentially considering BT connection information of the electronic device before considering AP connection information of the electronic device or the counterpart electronic device. For example, when the electronic device has been connected to a BT device, the electronic device may determine a P2P operating channel by preferentially considering information indicating that there is a BT connection, and when there is no Bluetooth connection, the electronic device may determine a P2P operating channel by considering AP connection information.

In operation 740, the electronic device may perform a wireless P2P operation between the electronic device and the counterpart electronic device according to the determined P2P operating channel.

Figure 8:
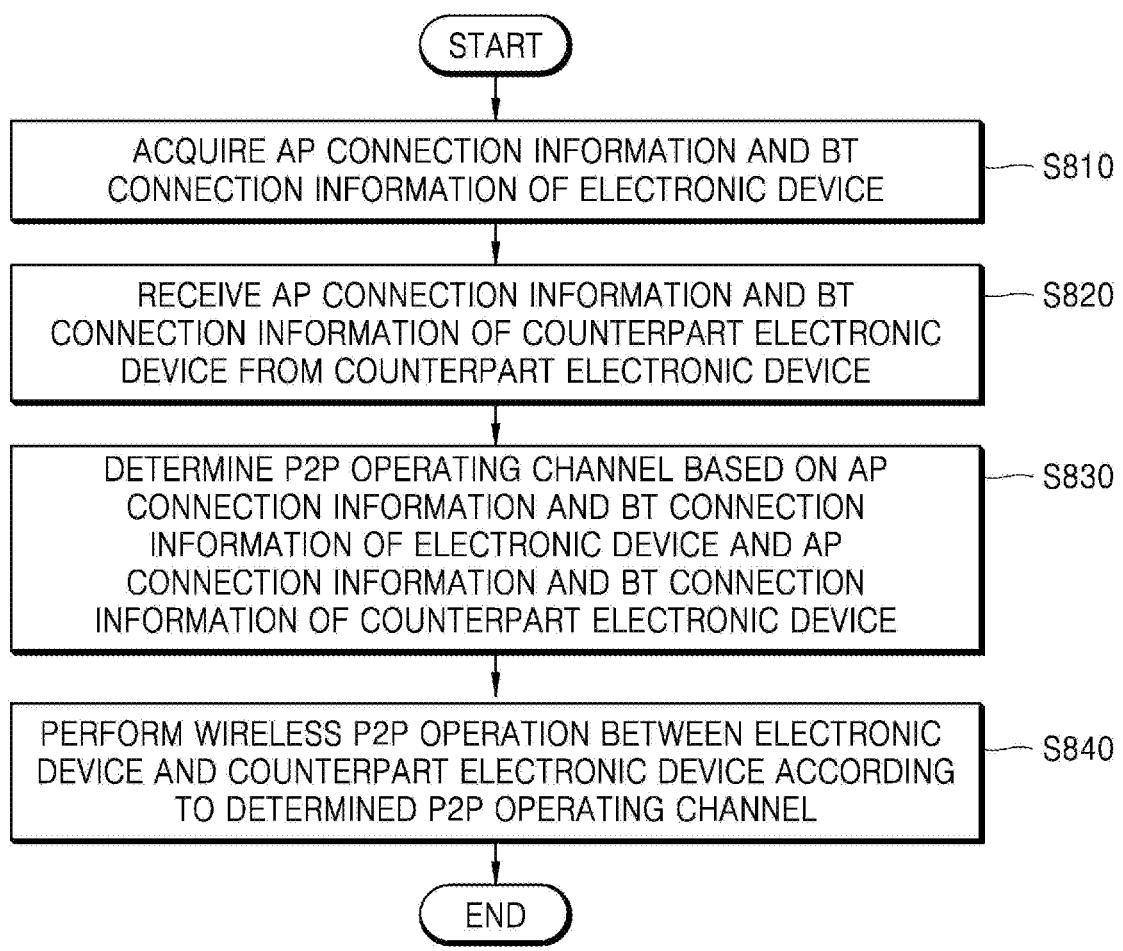
FIG. 8 is a flowchart showing a process of a method of determining a P2P operating channel according to an embodiment of the disclosure.

FIG. 8 is a flowchart showing a process of a P2P operating channel determining method according to an embodiment of the disclosure. The process shown in FIG. 8 is the same as that shown in FIG. 7, except that BT connection information of the counterpart electronic device is further considered when a P2P operating channel is determined. Accordingly, in the following description, descriptions about the same operations will be omitted.

Referring to FIG. 8, in operation 810, the electronic device may acquire AP connection information and BT connection information of the electronic device.

In operation 820, the electronic device may receive AP connection information and BT connection information of the counterpart electronic device from the counterpart electronic device.

The counterpart device may receive a message including the AP connection information and BT connection information of the counterpart electronic device from the counterpart electronic device during an operation of establishing a P2P connection to the counterpart electronic device, and parse the message to acquire the AP connection information and BT connection information of the counterpart electronic device. Herein, the AP to which the counterpart electronic device has been connected may be identical to or different from the AP to which the electronic device has been connected.

In operation 830, the electronic device may determine a P2P operating channel based on the AP connection information and BT connection information of the electronic device and the AP connection information and BT connection information of the counterpart electronic device.

In P2P communication, an operation of determining an operating channel may be performed by a group owner device, and an electronic device determined as a group owner device may determine a P2P operating channel based on the AP connection information and BT connection information of the electronic device and the AP connection information and BT connection information of the counterpart electronic device.

When any one of the electronic device or the counterpart electronic device that is a subject of a P2P connection has been connected to BT, P2P connection performance may be influenced. Therefore, the electronic device may consider BT connection information of the counterpart electronic device, as well as its own BT connection information.

That is, the electronic device may determine a P2P operating channel by preferentially considering BT connection information of the electronic device or the counterpart electronic device before considering AP connection information of the electronic device or the counterpart electronic device. For example, when the electronic device has been connected to a BT device or when the counterpart electronic device has been connected to a BT device, the electronic device may determine a P2P operating channel by preferentially considering information indicating that there is a BT connection, and when there is no BT connection, the electronic device may determine a P2P operating channel by considering AP connection information.

In operation 840, the electronic device may perform a wireless P2P operation between the electronic device and the counterpart electronic device according to the determined P2P operating channel.

Figure 9:
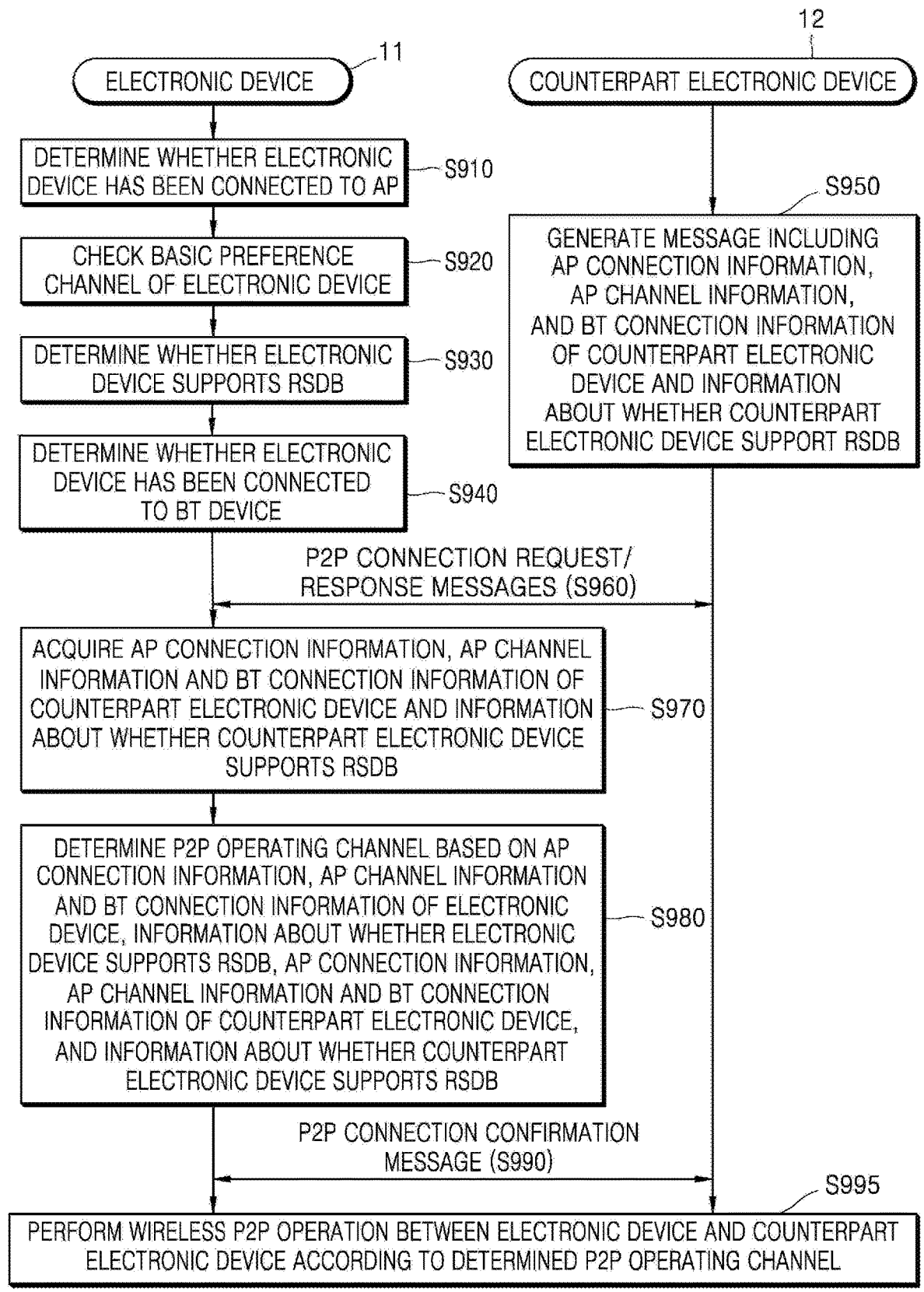
FIG. 9 is a flowchart showing a process of a method of determining a P2P operating channel according to an embodiment of the disclosure.

FIG. 9 is a flowchart showing a process of a P2P operating channel determining method according to an embodiment of the disclosure.

Referring to FIG. 9, in operation 910, an electronic device 11 may determine whether the electronic device 11 has been connected to an AP.

When a P2P connection request is received, the electronic device 11 may inquire of a wireless communication module of the electronic device 11 to determine whether there is an AP connection. Or, when an AP connection is established or released, that is, whenever AP connection information changes, the electronic device 11 may update information about whether there is an AP connection to latest information and store the latest information. When the electronic device 11 has been connected to an AP, the electronic device 11 may store information about a connected channel. When the electronic device 11 becomes a group owner upon a Wi-Fi direct connection, the information about whether there is an AP connection may be used as a determination condition for determining a P2P operating channel.

In operation 920, the electronic device 11 may check a basic preference channel.

The electronic device 11 may store a fixed 2.4 GHz preference channel (for example, a $1^{st}$ channel) and a fixed 5 GHz preference channel (for example, a $36^{th}$ channel), in addition to the AP channel to which the electronic device 11 has been connected. When the electronic device 11 becomes a group owner in the state in which the electronic device 11 has not been connected to an AP upon a Wi-Fi Direct connection, the electronic device 11 may use information about the basic preference channel as a determination condition for determining a P2P operating channel. According to an example, the information about the basic preference channel may be stored in the electronic device 11 when the electronic device 11 is manufactured. According to another example, the information about the basic preference channel may be stored in the electronic device 11 when the electronic device 11 is used.

In operation 930, the electronic device 11 may determine whether the electronic device 11 supports RSDB.

The electronic device 11 may determine whether the electronic device 11 supports RSDB, update information about whether the electronic device 11 supports RSDB to latest information and store the latest information. When the electronic device 11 becomes a group owner upon a Wi-Fi Direct connection, the electronic device 11 may use the information about whether the electronic device 11 supports RSDB as a determination condition for determining a P2P operating channel. RSDB or DBS technology is technology to enable a concurrent connection to and transmission/reception to/from different frequency bands (5 GHz and 2.4 GHz) in a Wi-Fi module supporting MIMO. According to an example, RSDB may be determined when the electronic device 11 is initialized.

In operation 940, the electronic device 11 may determine whether the electronic device 11 has been connected to a BT device.

The electronic device 11 may inquire of a BT module to determine whether the electronic device has been connected to a BT device. Whenever a BT connection is updated, the electronic device 11 may update information about whether there is a BT connection to latest information and store the latest information. Or, when a P2P connection request is received, the electronic device 11 may inquire of the BT module to check a BT connection. When the electronic device 11 becomes a group owner upon a Wi-Fi Direct connection, the electronic device 11 may use the information about whether there is a BT connection as a determination condition for determining a P2P operating channel.

In operation 950, the counterpart electronic device 12 may generate AP connection information, information about a connected AP channel, information about whether RSDB is supported, and BT connection information, and generate a message including the information.

The counterpart electronic device 12 attempting to establish a P2P connection may check and generate the information such that a group owner uses the information for determining a P2P operating channel, and include the information in a GO negotiation request message or an invitation request message which the counterpart electronic device 12 transmits to the electronic device 11 such that the electronic device 11 recognizes the AP connection information, the information about the connected AP channel, the information about whether RSDB is supported, and the information about whether there is a BT connection. The counterpart electronic device 12 may also acquire the information through the operations 910 to 940, like the electronic device 11.

In a frame of the GO negotiation request message or the invitation request message which the counterpart electronic device 12 transmits to the electronic device 11, a Vendor Specific Information Element (IE) may be newly added, and an Attribute format may be defined and generated. The information about whether there is an AP connection, the information about whether RSDB is supported, and the information about whether there is a BT connection may be set in a Vendor Specific Capability Attribute field of a bitmap form, and the information about the connected AP channel may be set in an Associated AP Info. Attribute field. The Vendor Specific Capability Attribute field and the Associated AP Info. Attribute field will be described in detail with reference to FIG. 13, later.

In operation 960, the electronic device 11 and the counterpart electronic device 12 that attempts to establish a P2P connection may transmit/receive a P2P connection request message and a P2P connection response message. The P2P connection request message may include, for example, a GO negotiation request message or an invitation request message. The P2P connection response message may include a negotiation response message.

In operation 970, the electronic device 11 may parse a message received from the counterpart electronic device 12 to acquire AP connection information of the counterpart electronic device 12, information about a connected AP channel, information about whether the counterpart electronic device 12 supports RSDB, and information about whether the counterpart electronic device 12 has been connected to BT.

In a P2P search operation and a connection request operation, the electronic device 11 may receive AP connection information of the counterpart electronic device 12, information about a connected AP channel, information about whether the counterpart electronic device 12 supports RSDB, and information about whether the counterpart electronic device 12 has been connected to BT, and store the received information.

The counterpart electronic device 12 attempting to establish a Wi-Fi Direct connection may send a connection request through a GO negotiation request message or an invitation request message (when a request for generating a persistent group is issued). The message may include a Vendor Specific IE, and a device received the connection request may parse Attribute information and store information about whether the counterpart electronic device 12 has been connected to an AP, information about a connected AP channel, information about whether the counterpart electronic device 12 supports RSDB, and information about whether the counterpart electronic device 12 has been connected to BT. When the electronic device 11 becomes a group owner upon a Wi-Fi direct connection, the information may be used as one of determination conditions for determining a P2P operating channel.

The electronic device 11 may set an operating channel field and exchange the operating channel field with the counterpart electronic device 12 when a group is generated during a P2P connection process.

When the electronic device 11 has not been connected to an AP, the electronic device 11 may select one among 5 GHz band channels in its own available channel list (select one of 2.4 GHz band channels when no 5 GHz band exists in the available channel list), set the selected channel in an operating channel field, then transmit a GO negotiation request packet, receive a GO negotiation response packet, and store information about a preference operating channel of the counterpart electronic device 12. When the electronic device 11 receives Associated AP Info. Attribute information from the counterpart electronic device 12, the electronic device 11 may update a connected AP channel information field to the information about the preference operating channel of the counterpart electronic device 12.

When the electronic device 11 has been connected to an AP channel, the electronic device 11 may set the corresponding channel in the operating channel field, then transmit a GO negotiation request packet, receive a GO negotiation response packet, and store information about a preference operating channel of the counterpart electronic device 12. When the electronic device 11 receives Associated AP Info. Attribute information from the counterpart electronic device 12, the electronic device 11 may update the connected AP channel information field to the information about the preference operating channel of the counterpart electronic device 12.

However, when the electronic device 11 receives a request for generating a persistent group through an Invitation message from the counterpart electronic device 12, an operation of requesting a P2P connection and an operation of generating a group may be performed simultaneously. That is, after an invitation request packet is received, information about whether the counterpart electronic device 12 has been connected to an AP, information about a connected AP channel, information about whether RSDB is supported, and an operating channel field may be stored at the electronic device 11. When Associated AP Info. Attribute information is received from the counterpart electronic device 12, the connected AP channel information field may be updated to preference operating channel information of the counterpart electronic device 12.

In operation 980, the electronic device 11 may determine a P2P operating channel based on the AP connection information of the electronic device 11, the information about the connected AP channel, the information about whether the electronic device 11 supports RSDB, the BT connection information of the electronic device 11, the AP connection information of the counterpart electronic device 12, the information about the connected AP channel, the information about whether the counterpart electronic device 12 supports RSDB, and the BT connection information of the counterpart electronic device 12. A case in which the electronic device 11 determines a P2P operating channel is a case in which the electronic device 11 has been determined as a P2P group owner. Herein, it is assumed that the electronic device 11 has been determined as a group owner.

When the electronic device 11 determines a P2P operating channel based on various information described above, determination methods may be used depending on various scenarios according to various conditions. However, according to a basic concept for determining a P2P operating channel, the electronic device 11 may consider BT connection information of the electronic device 11 and BT connection information of the counterpart electronic device 12 in preference to other information, because a performance deterioration caused by a BT connection of an electronic device is greater than performance deterioration caused by counterpart communication connections.

For example, when the electronic device 11 or the counterpart electronic device 12 has been connected to BT, the electronic device 11 may determine a P2P operating channel by preferentially considering the BT connection, and when the electronic device 11 or the counterpart electronic device 12 is not connected to BT, the electronic device 11 may determine a P2P operating channel by considering AP connection information or whether RSDB is supported. Various scenarios for determining a P2P operating channel in consideration of the information in the electronic device 11 will be described later.

In operation 990, the electronic device 11 may transmit information about the determined operating channel to the counterpart electronic device 12, and the counterpart electronic device 12 may check the information about the determined operating channel. The electronic device 11 may include the information about the operating channel in a P2P connection confirmation message and then transmit the P2P connection confirmation message to the counterpart electronic device 12.

In operation 995, the electronic device 11 and the counterpart electronic device 12 may perform a wireless P2P operation according to the determined operating channel.

When two P2P devices find each other, a group owner negotiation operation may start. The group owner negotiation operation may consist of three handshakes of Group Owner Negotiation Request/Response/Confirmation. By the handshakes, the two devices may negotiate which one will operate as a P2P GO and a channel (for example, 2.4 GHz or 5 GHz) with which the group will operate.

Figure 10:
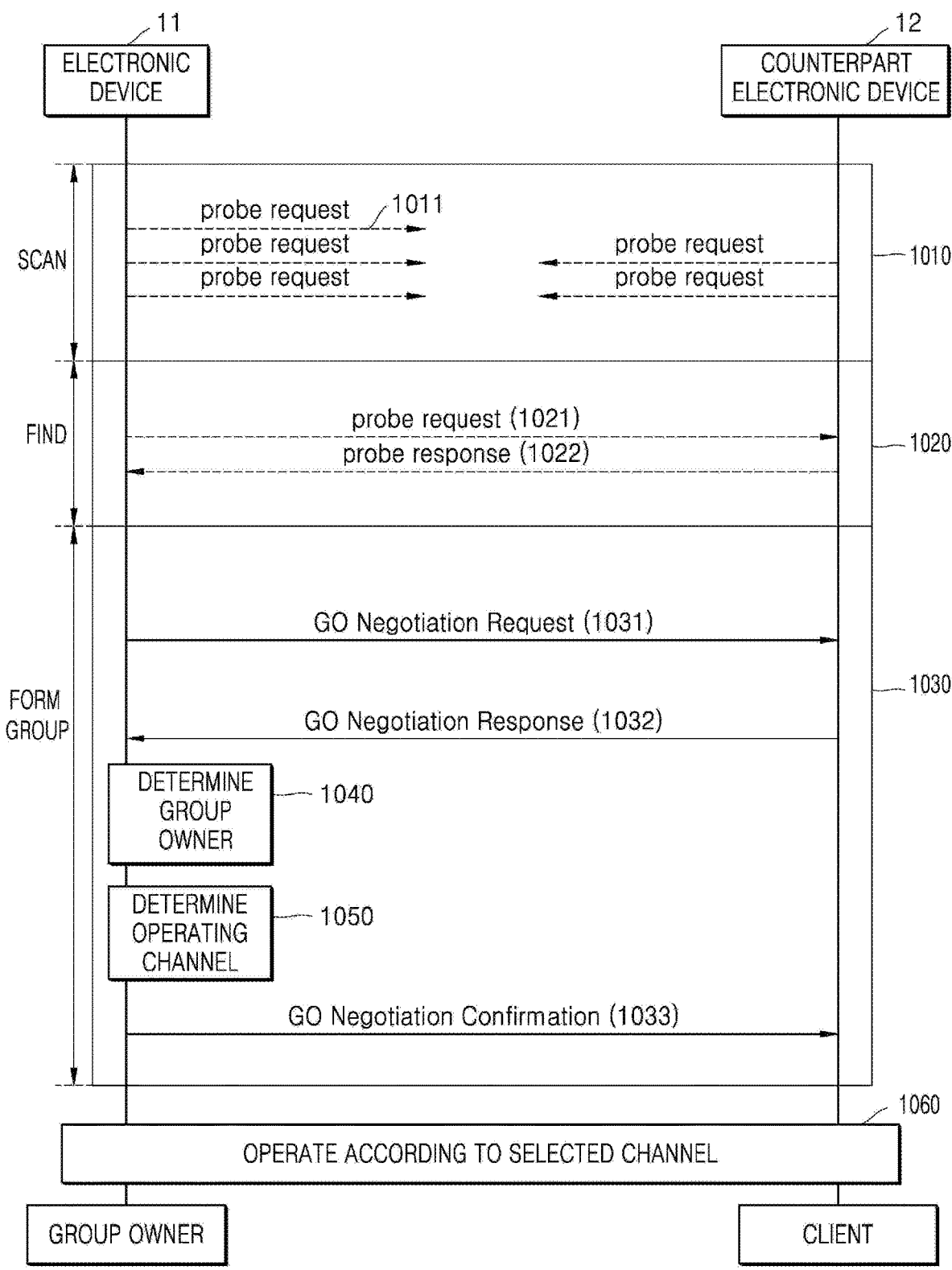
FIG. 10 shows an example of a group forming operation of P2P devices according to an embodiment of the disclosure.

FIG. 10 shows an example of a group forming operation of P2P devices according to an example.

Referring to FIG. 10, the electronic device 11 and the counterpart electronic device 12 may transmit probe request frames 1011 to each other in scan operation 1010.

In find operation 1020, when the counterpart electronic device 12 transmits a probe response frame 1021 to the electronic device 11 in response to a probe request frame 1022 transmitted to the counterpart electronic device 12 from the electronic device 11, the electronic device 11 and the counterpart electronic device 12 may find each other.

In group forming operation 1030, which device will function as a P2P group owner and will form a new P2P group may be determined. To form a group, P2P devices may perform group owner negotiation. The group owner negotiation may be frame exchange that is used to agree with which P2P device will function as a P2P group owner. The group owner negotiation is aimed to exchange group owner intent attributes to communicate a preference of hoping to become a P2P group owner, and through such frame exchange, a group owner may be determined.

Referring to FIG. 10, in the group forming operation 1030, the electronic device 11 may transmit a group owner negotiation request frame 1031 to the counterpart electronic device 12 to start the group owner negotiation. The electronic device 11 may transmit information indicating which one of the electronic device 11 and the counterpart electronic device 12 will become an owner device by using a group owner negotiation request frame 1031. A device that wants to establish a P2P connection may include information which a group owner device may refer to upon determining an operating channel in a group owner negotiation request frame. The information which the group owner device may refer to upon determining an operating channel may include one or more among information about whether there is an AP connection, information about whether RSDB is supported, information about whether there is a BT connection, and Wi-Fi channel information.

The electronic device 11 may receive a group owner negotiation response frame 1032 from the counterpart electronic device 12. When the electronic device 11 receives a GO negotiation response frame representing a state code success, the electronic device 11 may examine the received information and response to the received GO negotiation response frame by transmitting a GO negotiation confirmation frame 1033.

After operation 1040 in which the electronic device 11 is determined as a group owner, the electronic device 11 may perform operation 1050 of determining an operating channel.

At this time, the electronic device 11 may determine an operating channel according to an operating channel determining method according to embodiments of the disclosure.

After an operating channel is determined, the electronic device 11 may transmit information about the determined operating channel to the counterpart electronic device 12 by using a GO negotiation confirmation frame 1033. Then, the electronic device 11 and the counterpart electronic device 12 may perform operation 1060 according to the determined operating channel.

Figure 11:
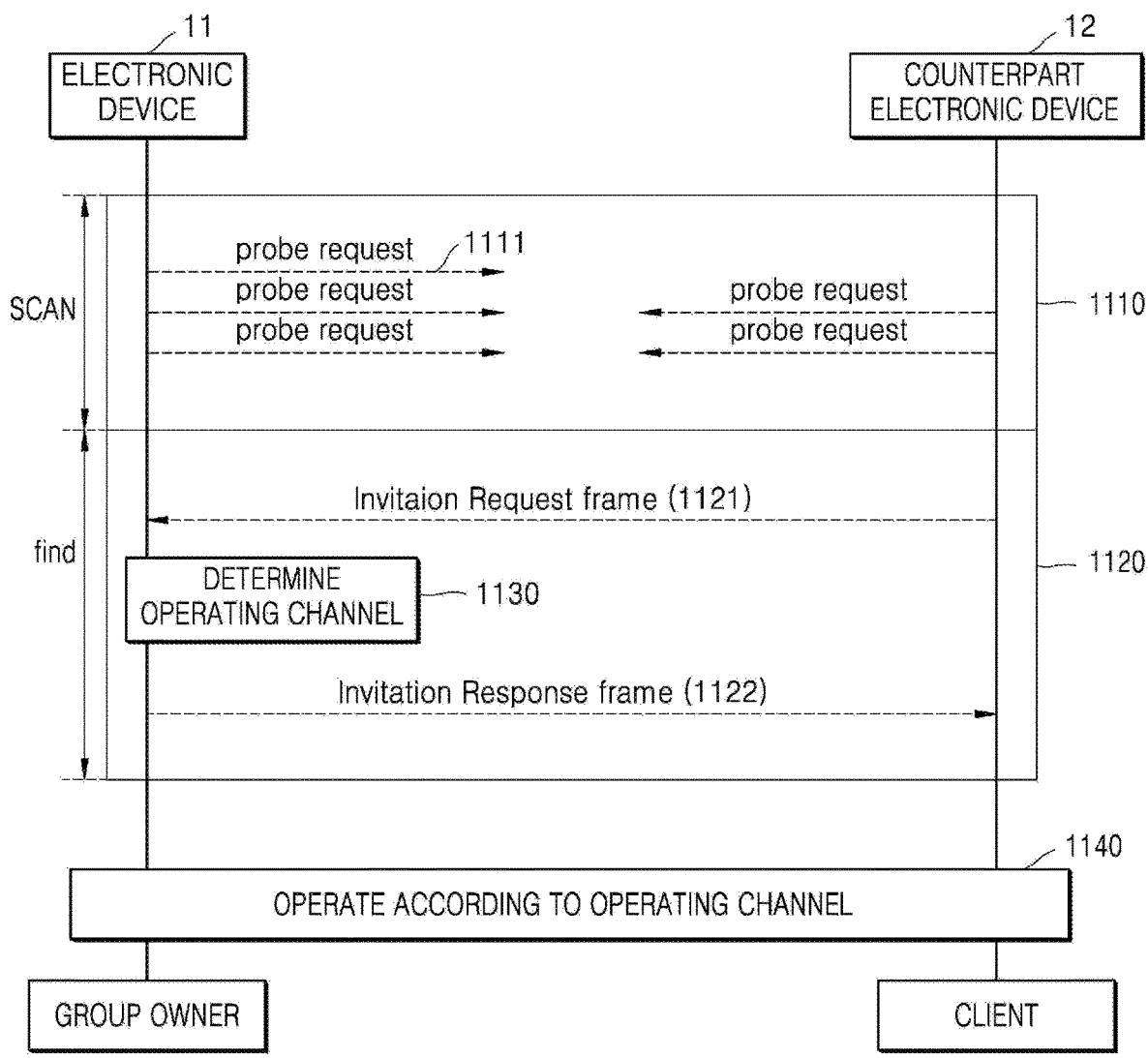
FIG. 11 shows an example of a group forming operation of P2P devices according to an embodiment of the disclosure.

FIG. 11 shows an example of a group forming operation of P2P devices according to an example.

Referring to FIG. 11, the electronic device 11 and the counterpart electronic device 12 may transmit probe request frames 1111 to each other, in scan operation 1110.

In find operation 1120, the electronic device 11 may transmit an invitation request frame 1121, and the counterpart electronic device 12 may transmit an invitation response frame 1122 in response to the invitation request frame 1121.

A P2P invitation procedure may be, for example, a procedure in which a P2P group owner invites a P2P client in its own P2P group. A P2P invitation request frame may be sent from a P2P group member being a P2P group owner or a P2P group client to a P2P device which is not a member of the P2P group. A device which wants to establish a P2P connection may include information which a group owner device may refer to upon determining an operating channel in an invitation request frame. The information which the group owner device may refer to upon determining an operating channel may include one or more among information about whether there is an AP connection, information about whether RSDB is supported, information about whether there is a BT connection, and Wi-Fi channel information.

The electronic device 11 which has received the invitation request frame 1121 may perform operation 1130 of determining an operating channel.

At this time, the electronic device 11 may determine an operating channel according to an operating channel determining method according to embodiments of the disclosure.

After an operating channel is determined, the electronic device 11 may transmit information about the determined operating channel to the counterpart electronic device 12 by using an invitation response frame 1122. Then, the electronic device 11 and the counterpart electronic device 12 may perform operation 1140 according to the determined operating channel.

Figure 12:
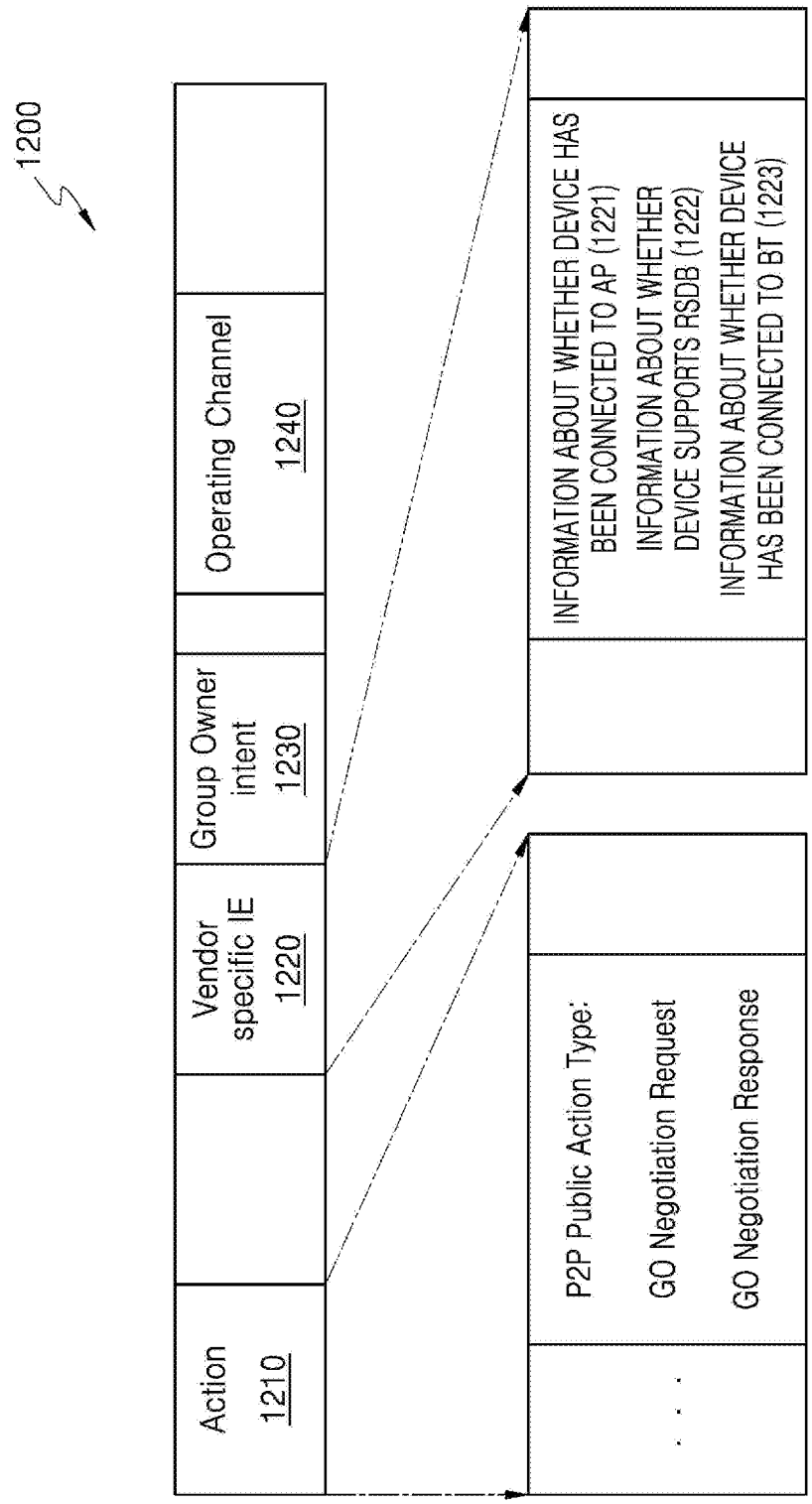
FIG. 12 shows an example of a P2P frame according to an embodiment of the disclosure.

FIG. 12 shows an example of a P2P frame according to an embodiment of the disclosure.

The counterpart electronic device 12 which wants to establish a Wi-Fi Direct connection may transmit a connection request through a GO negotiation request message shown in FIG. 10 or an invitation request message shown in FIG. 11 (when a persistent group generating request is issued). The messages may include a Vendor Specific Information Element, and a device (also referred to as a P2P device) which has received the connection request may parse Attribute information to store information about whether the counterpart device has been connected to an AP, information about a connected AP channel, and information about whether RSDB is supported. When the device becomes a GO upon a Wi-Fi Direct connection, the information may be used as one of determination conditions for determining a P2P operating channel.

Referring to FIG. 12, a P2P connection frame 1200 may include an Action field 1210, a Vendor Specific IE field 1220, a Group Owner Intent field 1230, and an operating channel field 1240.

The Action field 1210 may represent whether the corresponding frame is a GO negotiation request frame or a GO negotiation response frame.

The Vendor Specific IE field 1220 may include information 1221 about whether the device has been connected to an AP, information 1222 about whether the device supports RSDB, and information 1223 about whether the device has been connected to a BT device.

The Group Owner Intent field 1230 may be information representing a degree by which the device transmitting the corresponding frame hopes to become a group owner.

The operating channel field 1240 may include information about a frequency band with which the P2P device operates as a P2P group owner, information about a preferred operating frequency band of the P2P device, information about a number of a channel with which the P2P device operates as a P2P group owner, or information about a number of a preferred channel of the P2P device.

Figure 13:
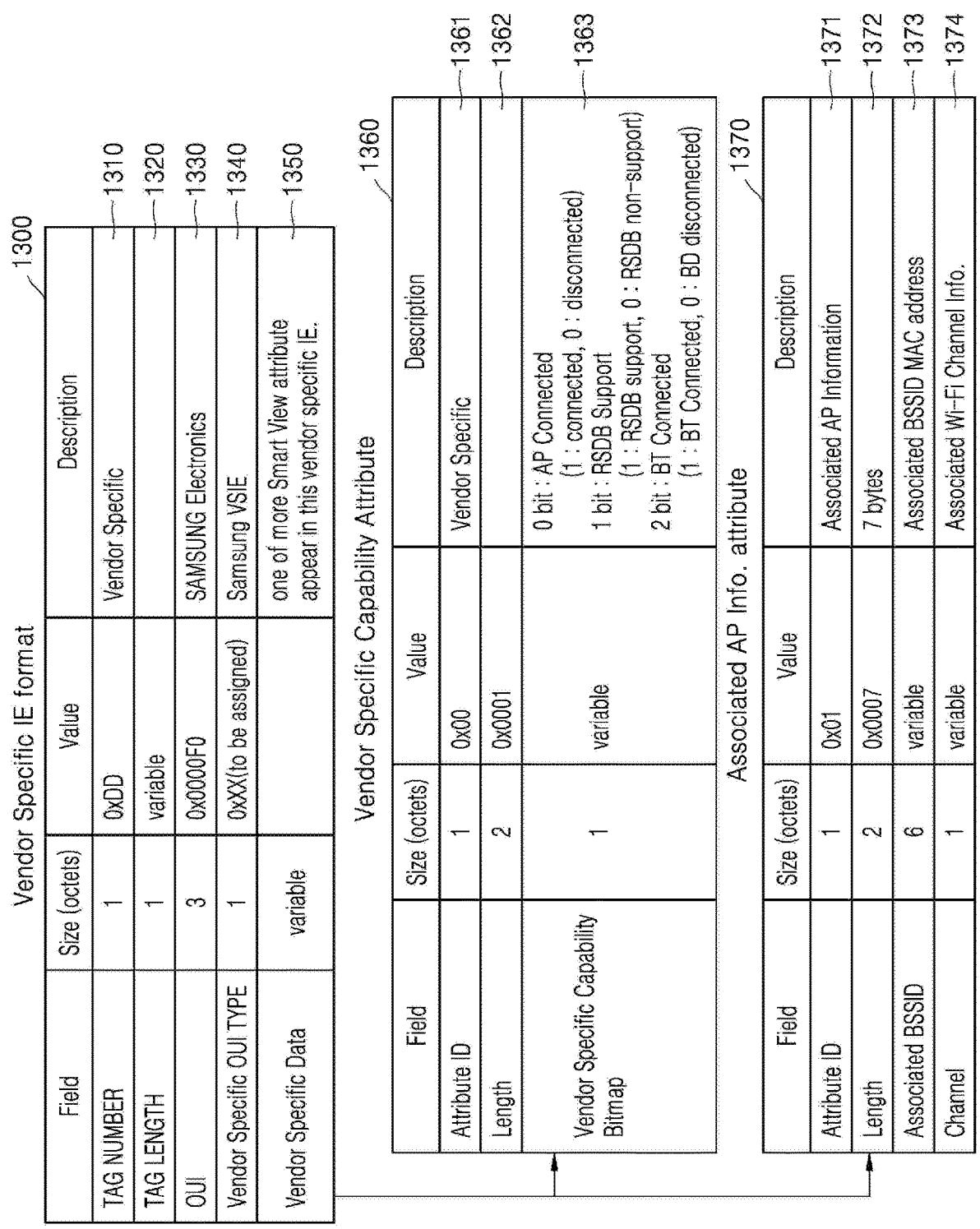
FIG. 13 shows an example of a Vendor Specific Information Element (IE) according to an embodiment of the disclosure.

FIG. 13 shows an example of a Vendor Specific IE format 1300 according to an embodiment of the disclosure.

Referring to FIG. 13, the Vendor Specific IE format 1300 may include a tag number 1310, a tag length 1320, OUI 1330, Vendor Specific OUI TYPE 1340, and Vendor Specific Data 1350.

According to the current embodiment of the disclosure, various attribute information that may be used when a group owner device determines an operating channel may be stored by using a field of Vendor Specific Data 1350.

Vendor Specific Capability Attribute 1360 may include Attribute ID 1361, Length 1362, and Vendor Specific Capability Bitmap 1363. According to an embodiment of the disclosure, the Bitmap 1363 may assign at least three bits so that bit 0 represents information about whether there is an AP connection, bit 1 represents information about whether RSDB is supported, and bit 2 represents information about whether there is a BT connection. For example, when a value of bit 0 is 1, it may represent that there is an AP connection, and when a value of bit 0 is 0, it may represent that there is no AP connection. When a value of bit 1 is 1, it may represent that RSDB is supported, and when a value of bit 1 is 0, it may represent that RSDB is not supported. When a value of bit 2 is 0, it may represent that there is a BT connection, and when a value of bit 2 is 0, it may represent that there is no BT connection.

Associated AP Info. Attribute 1370 may include Attribute ID 1371, Length 1372, Associated BSSID 1373, and Channel 1374. Herein, a field of Channel 1374 may include associated Wi-Fi channel information.

Figure 14:
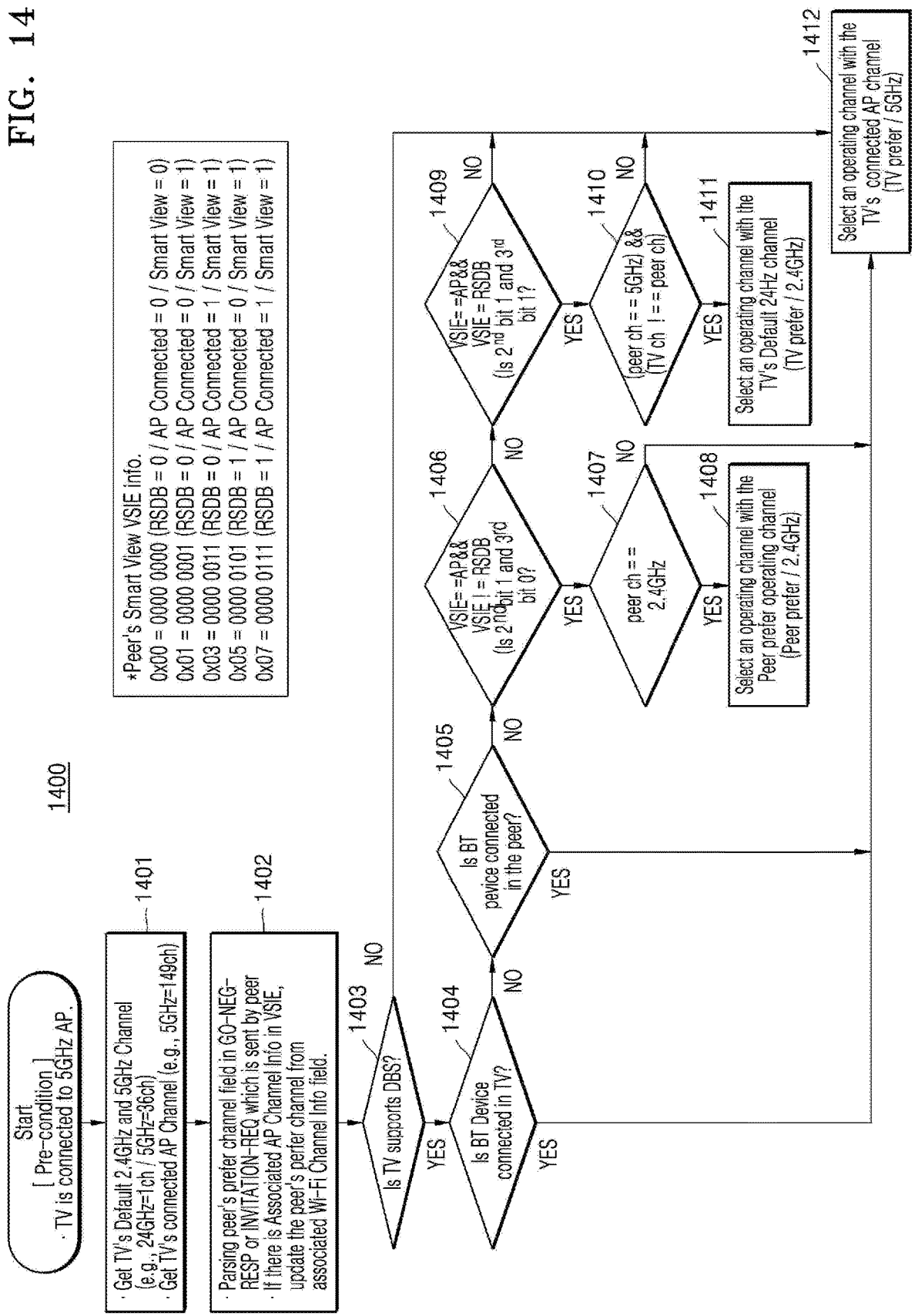
FIG. 14 shows a logic for setting a P2P operating channel when a TV has been connected to an access point (AP) with a 5 GHz band, according to an embodiment of the disclosure.

FIG. 14 shows a logic 1400 for setting a P2P operating channel when a TV has been connected to an AP with a 5 GHz band, according to an embodiment of the disclosure. In the logic 1400, there is a pre-emptive condition that the TV has been connected to the AP with a 5 GHz band.

Referring to FIG. 14, in operation 1401, the TV may acquire defaults 2.4 GHz and 5 GHz channels of the TV. For example, a $1^{st}$ channel may be acquired for 2.4 GHz, and a $36^{th}$ channel may be acquired for 5 GHz. Also, the TV may acquire an AP channel connected to the TV. For example, a $149^{th}$ channel may be acquired for 5 GHz AP-connected to the TV.

In operation 1402, a preference channel field of a peer may be acquired from a GO negotiation response frame or an invitation request frame sent by the peer. When there is AP channel information associated with VSIE, the TV may update a preference channel of the peer from an associated Wi-Fi channel information field.

In operation 1403, the TV may determine whether the TV supports DBS. When the TV does not support DBS, the process may proceed to operation 1412 to determine, as an operating channel, a channel (5 GHz) which the TV uses when establishing an AP connection. When the TV supports DBS, the process may proceed to operation 1404.

In operation 1404, the TV may determine whether the TV has been connected to a BT device. When the TV has been connected to a BT device, the process may proceed to operation 1412 to determine, as an operating channel, a channel (5 GHz) which the TV uses when establishing an AP connection. When the TV has not been connected to a BT device, the process may proceed to operation 1405.

In operation 1405, the TV may determine whether the peer has been connected to a BT device. When the peer has been connected to a BT device, the process may proceed to operation 1412 to determine, as an operating channel, a channel (5 GHz) which the TV uses when establishing an AP connection. When the peer has not been connected to a BT device, the process may proceed to operation 1406.

In operation 1406, the TV may determine whether the peer has been connected to an AP and whether the peer supports RSDB. When the peer has been connected to an AP but the peer does not support RSDB, the process may proceed to operation 1407, and when the peer has been connected to an AP and the peer does not support RSDB, the process may proceed to operation 1409.

In operation 1407, the TV may determine whether an AP connection band of the peer is 2.4 GHz. When an AP connection band of the peer is 2.4 GHz, the process may proceed to operation 1408, and in operation 1408, the TV may determine a preference operating channel of the peer as an operating channel. Herein, because the peer has been connected to the AP at 2.4 GHz, the preference operating channel of the peer may be 2.4 GHz. When the AP connection band of the peer is not 2.4 GHz, the process may proceed to operation 1412.

In operation 1409, the TV may determine whether the peer has been connected to an AP and supports RSDB. When the peer has been connected to an AP and supports RSDB, the process may proceed to operation 1410. In operation 1410, the TV may determine whether an AP channel to which the peer has been connected is 5 GHz and a preference channel of the TV is identical to the preference channel of the peer. When the AP channel to which the peer has been connected is 5 GHz and the preference channel of the TV is different from the preference channel of the peer, the process may proceed to operation 1411. In operation 1411, the TV may determine a 2.4 GHz default channel as an operating channel. When the channel to which the peer has been connected is not 5 GHz, the process may proceed to operation 1412.

FIGS. 15 to 18 illustrate, when a device to operate as a GO has been connected to an AP of a 5 GHz band, P2P operating channels between a case in which a BT connection is considered and a case in which a BT connection is not considered, according to scenarios depending on whether the device to operate as the GO supports RSDB, whether the device has been connected to BT, an AP connection channel of the counterpart device, and whether the other device supports RSDB. In both a case (case 1-1) in which the other device and the device to operate as the GO have been connected to the same 5 GHz AP channel and a case (case 1-3) in which the other device has not been connected to an AP, an operating channel setting may be the same regardless of whether or not a BT connection is considered. However, in a case (case 1-2) in which the counterpart device has been connected to an AP of a 2.4 GHz channel and a case (case 1-4) in which the counterpart device has been connected to AP of 5 GHz channel, a P2P operating channel may be set to a 5 GHz AP channel connected to the device to operate as the GO based on a scenario of connecting to a BT device simultaneously according to an operating channel setting method of the disclosure, thereby reducing interference of the 2.4 GHz band. When the counterpart device supporting MCC has been connected to a BT device, 2.4 GHz interference may be reduced compared to a 2.4 GHz P2P connection although MCC occurs in the counterpart device, thereby improving wireless quality performance.

Figure 15:
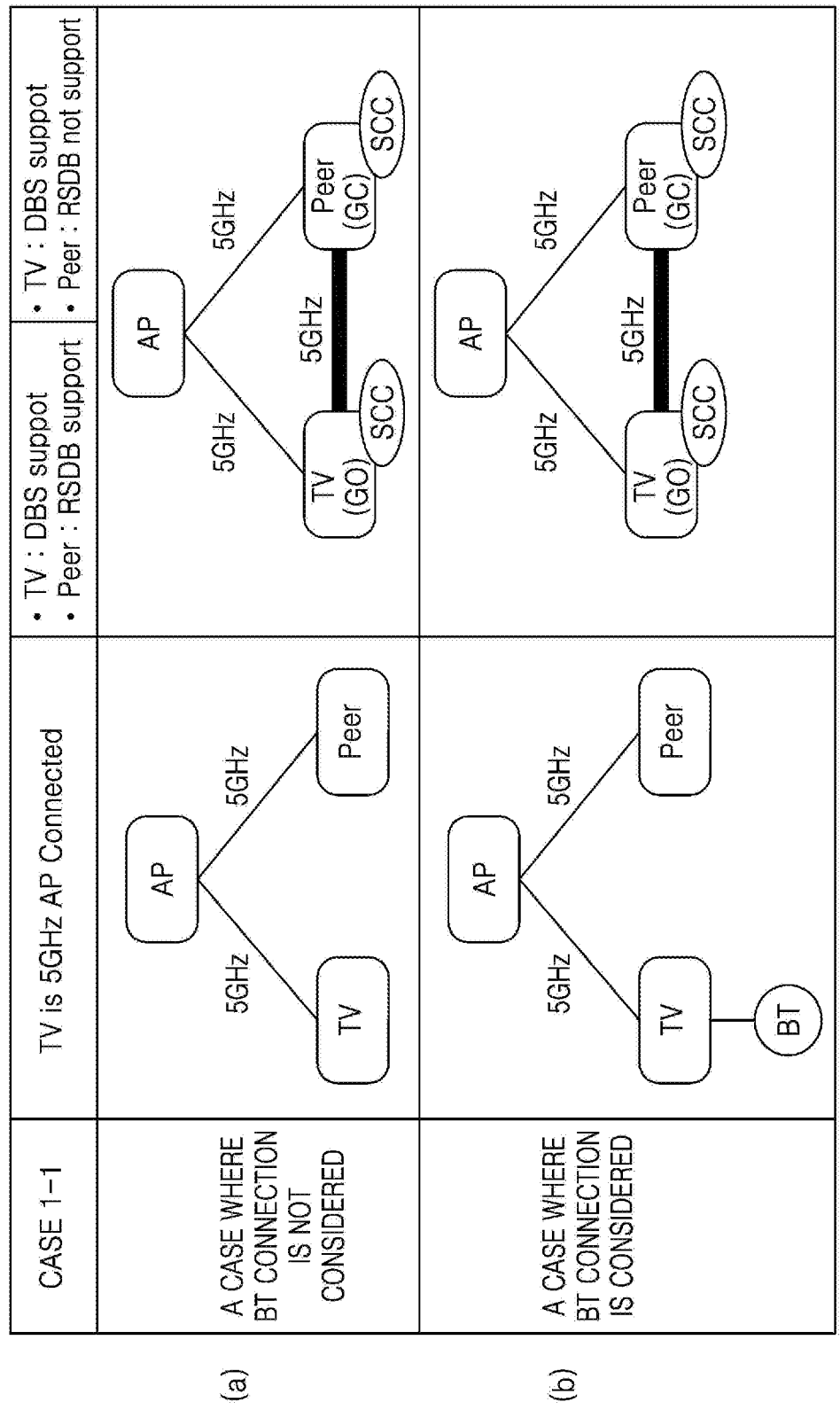
FIG. 15 shows an operating channel setting in a case (case 1-1) in which both a TV and a peer have been connected to an AP with a 5 GHz band, according to an embodiment of the disclosure.

FIG. 15 shows an operating channel setting of a case (case 1-1) in which both a TV and a peer have been connected to an AP with a 5 GHz band, according to an embodiment of the disclosure. There is a pre-emptive condition that the TV supports DBS and the peer supports/does not support RSDB.

Referring to FIG. 15, (a) represents a case in which a BT connection is not considered. In this case, because both the TV and the peer have been connected to an AP with a 5 GHz band, a P2P operating channel between the TV and the peer may be determined as 5 GHz. (b) represents a case in which the TV has been connected to BT, and when an operating channel is set, the BT connection of the TV may be considered. In the case of (b), because both the TV and the peer have been connected to an AP with a 5 GHz band although a BT connection is considered, a P2P operating channel between the TV and the peer may be determined as 5 GHz.

Figure 16:
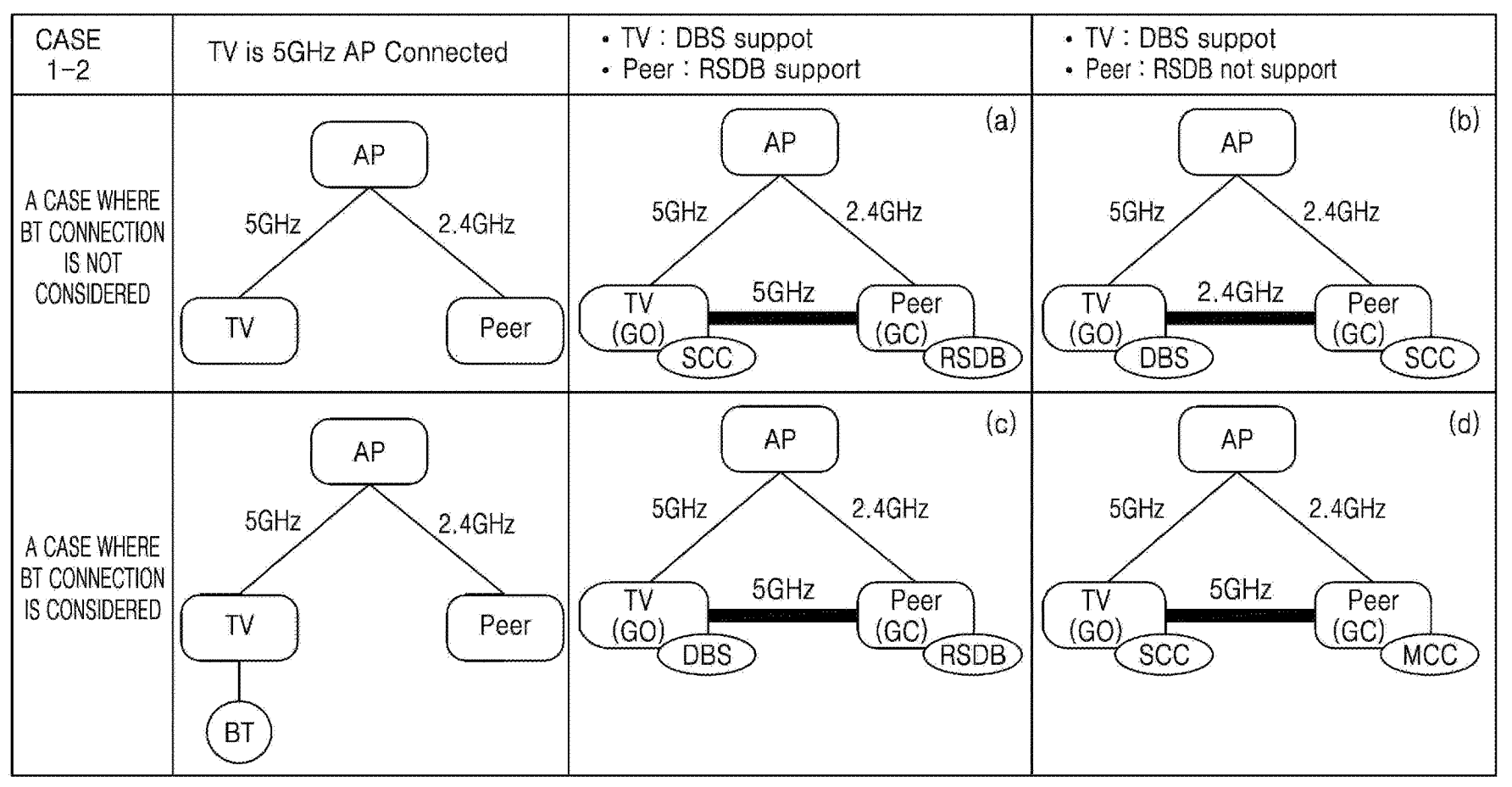

FIG. 16 shows an operating channel setting of a case (case 1-2) in which a TV has been connected to an AP with a 5 GHz band and a peer has been connected to the AP with a 2.4 GHz band, according to an embodiment of the disclosure. As a pre-emptive condition, all cases in which the TV supports DBS and the peer supports/does not support RSDB will be considered.

Referring to FIG. 16, (a) and (b) represent cases in which a BT connection is not considered, and in these cases, different operating channel settings may be provided for a case in which the peer supports RSDB and a case in which the peer does not support RSDB. In the case (a) in which the peer supports RSDB, a P2P operating channel between the TV and the peer may be determined as 5 GHz because the TV has been connected to an AP at 5 GHz and the peer has been connected to the AP at 2.4 GHz. In this case, because the peer supports RSDB although an AP connection channel of the peer is different from a P2P operating channel of the peer, no performance deterioration may occur, and the TV may satisfy SCC. In the case (b) in which the peer does not support RSDB, a P2P operating channel between the TV and the peer may be determined as 2.4 GHz because the TV has been connected to the AP at 5 GHz and the peer has been connected to the AP at 2.4 GHz. In this case, the P2P operating channel of the peer may be set to be identical to the AP operating channel of the peer to prevent generation of MCC in the peer, because the peer does not support RSDB. Because the AP connection channel of the TV is different from the P2P connection channel of the TV, there may be a generation probability of MCC. However, because the TV supports DBS, performance deterioration may be prevented.

(c) and (d) of FIG. 16 represent cases in which a BT connection is considered, and in these cases, different operating channel settings may be provided for a case in which a peer supports RSDB and a case in which the peer does not support RSDB. In the case (c) in which the peer supports RSDB, a P2P operating channel between the TV and the peer may be determined as 5 GHz. When the TV has been connected to BT, a BT connection may need to be preferentially considered. Accordingly, a P2P operating channel may be selected as 5 GHz to avoid overlapping with 2.4 GHz being a BT connection channel. In the case (d) in which the peer does not support RSDB, a P2P operating channel between the TV and the peer may be determined as 5 GHz. In this case, MCC will be generated in the peer because the peer does not support RSDB. However, because performance deterioration caused by the generation of MCC is smaller than performance deterioration caused by overlapping of the P2P channel with the BT connection band, a P2P operating channel between the TV and the peer may be determined as 5 GHz, instead of 2.4 GHz.

Figure 17:
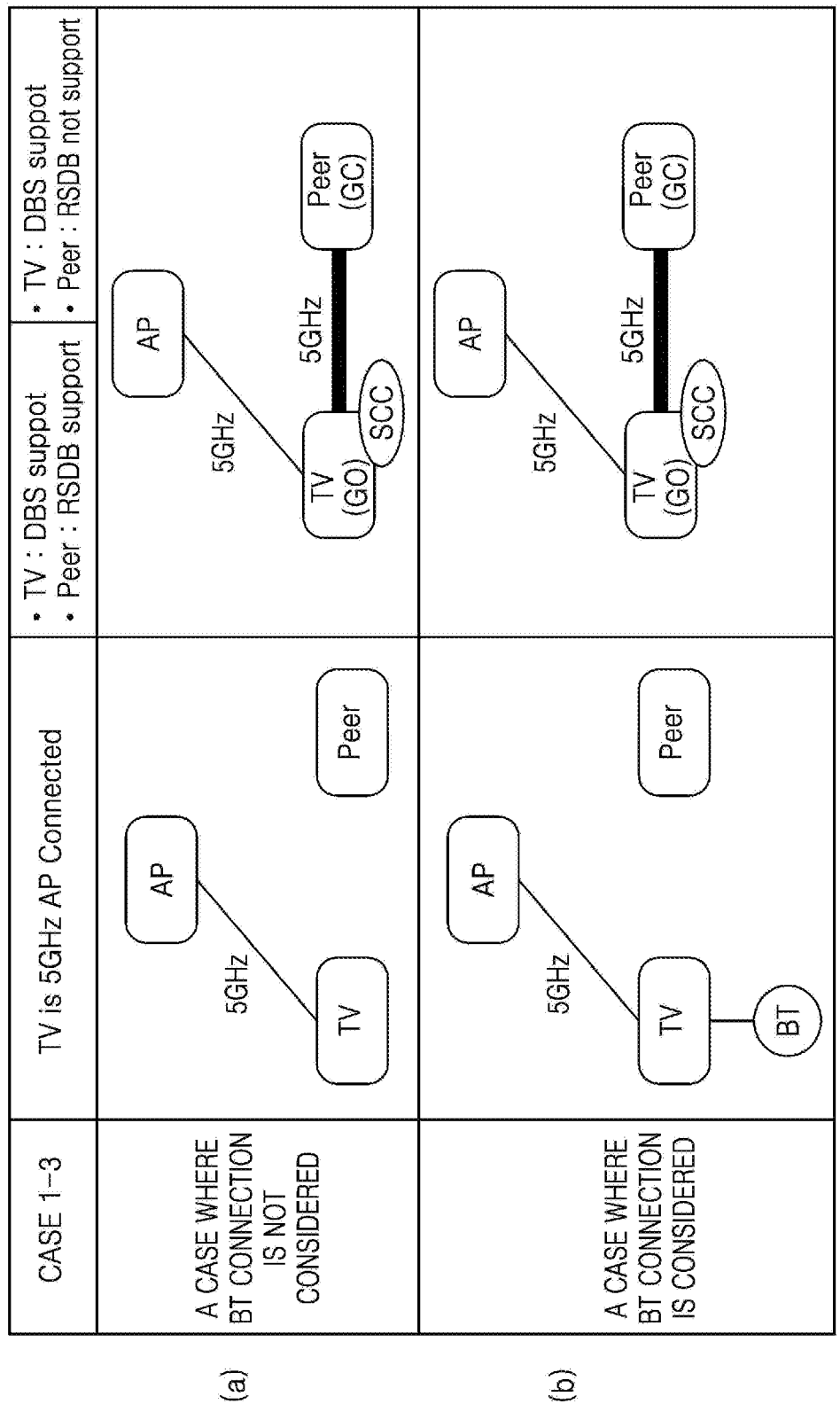
FIG. 17 shows an operating channel setting in a case (case 1-3) in which a TV has been connected to an AP with a 5 GHz band and a peer has not been connected to an AP, according to an embodiment of the disclosure.

FIG. 17 shows an operating channel setting in a case (case 1-3) in which a TV has been connected to an AP with a 5 GHz band and a peer has not been connected to an AP, according to an embodiment of the disclosure. There is a pre-emptive condition that the TV supports DBS and the peer supports/does not support RSDB.

Referring to FIG. 17, (a) represents a case in which a BT connection is not considered. In this case, because the TV has been connected to an AP with a 5 GHz band, and the peer has not been connected to an AP, a P2P operating channel between the TV and the peer may be determined as 5 GHz. (b) represents a case in which the TV has been connected to BT and a BT connection is considered when an operating channel is set. In the case (b), even when a BT connection is considered, a P2P operating channel between the TV and the peer may be determined as 5 GHz to avoid a 2.4 GHz band used for a BT connection.

FIG. 18 shows an operating channel setting in a case (case 1-4) in which a TV and a peer have been connected to an AP with different channels of 5 GHz, according to an embodiment of the disclosure. There is a pre-emptive condition that the TV supports DBS and the peer supports/does not support RSDB.

Referring to FIG. 18, (a) and (b) represent cases in which a BT connection is not considered, and in these cases, different operating channel settings may be provided for a case in which the peer supports RSDB and a case in which the peer does not support RSDB. In the case (a) of supporting RSDB, a P2P operating channel between the TV and the peer may be determined as 2.4 GHz. In this case, although AP connection channels of the TV and the peer are different from P2P operating channels of the TV and the peer, no performance deterioration may be generated because both the TV and the peer support DBS and RSDB, respectively. In the case (b) in which the peer does not support RSDB, an P2P operating channel between the TV and the peer may be determined as one of a 5 GHz AP channel connected to the TV and a 5 GHz AP channel connected to the peer to perform an SCC operation in the TV or the peer because it is impossible to avoid MCC.

(c) of FIG. 18 represents a case in which a BT connection is considered, and in this case, the same operating channel setting may be provided for a case in which the peer supports RSDB and a case in which the peer does not support RSDB. In the case (c), a P2P operating channel between the TV and the peer may be determined as 5 GHz. When the TV has been connected to BT, a BT connection may need to be preferentially considered, and accordingly, a P2P operating channel may be selected as 5 GHz to avoid overlapping with 2.4 GHz being a BT connection channel.

Figure 19:
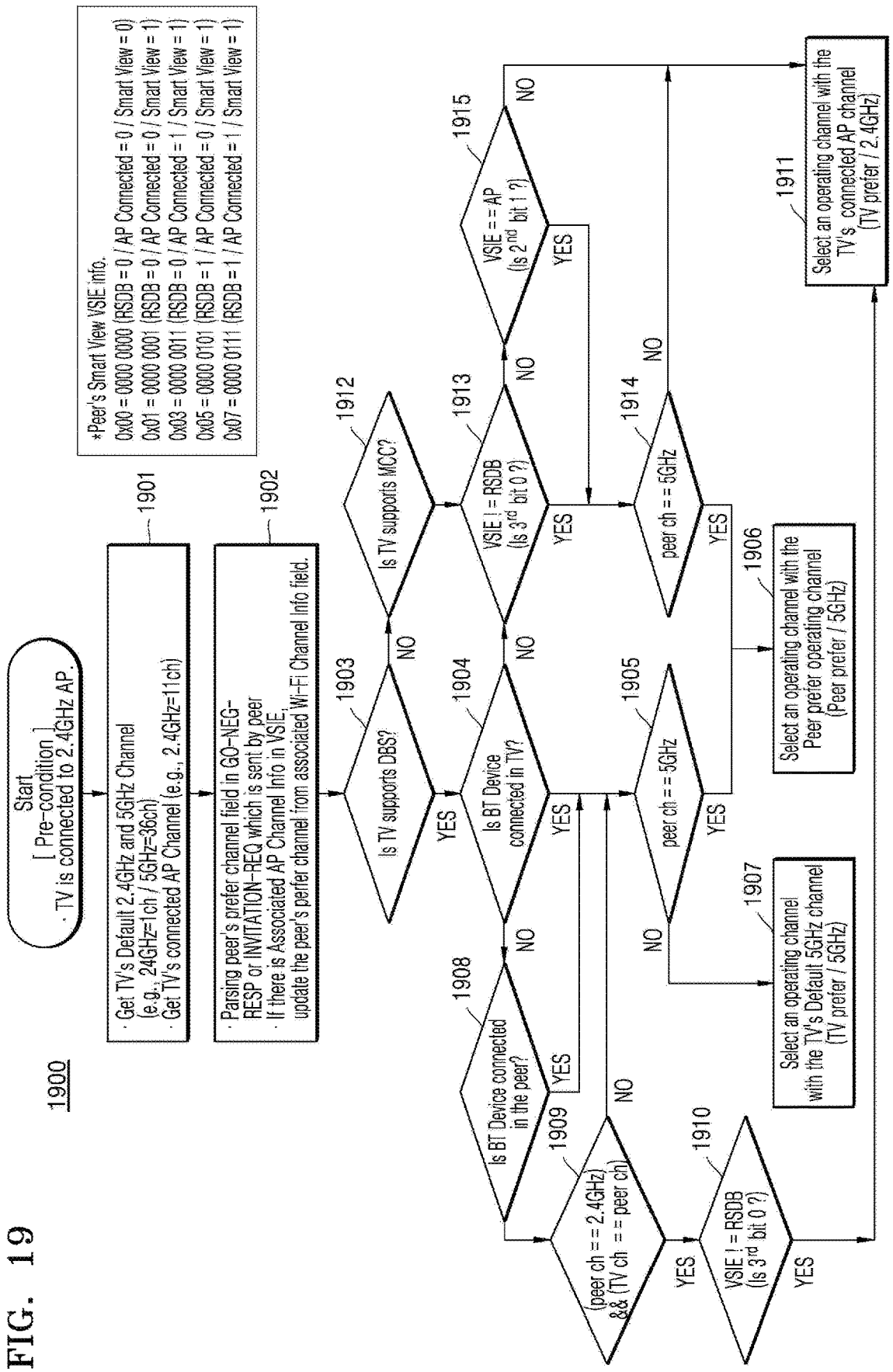
FIG. 19 shows a logic for setting a P2P operating channel when a TV has been connected to an AP with a 2.4 GHz band, according to an embodiment of the disclosure.

FIG. 19 shows a logic 1900 for setting a P2P operating channel when a TV has been connected to an AP with a 2.4 GHz band, according to an embodiment of the disclosure. In the logic 1900, there is a pre-emptive condition that the TV has been connected to the AP with a 2.4 GHz band.

Referring to FIG. 19, in operation 1901, the TV may acquire defaults 2.4 GHz and 5 GHz channels of the TV. For example, a $1^{st}$ channel may be acquired for 2.4 GHz, and a $36^{th}$ channel may be acquired for 5 GHz. Also, the TV may acquire an AP channel connected to the TV. For example, an $11^{th}$ channel may be acquired for 2.4 GHz AP-connected to the TV.

In operation 1902, preference channel information of a peer may be acquired from a GO negotiation response frame or an invitation request frame sent by the peer. When there is AP channel information associated with VSIE, the TV may update a preference channel of the peer from an associated Wi-Fi channel information field.

In operation 1903, the TV may determine whether the TV supports DBS. When the TV does not support DBS, the process may proceed to operation 1912. When the TV supports DBS, the process may proceed to operation 1904.

In operation 1904, the TV may determine whether the TV has been connected to a BT device. When the TV has been connected to the BT device, the process may proceed to operation 1905. When the TV has been connected to no BT device, the process may proceed to operation 1908.

In operation 1905, the TV may determine whether an AP connection channel of the peer is 5 GHz. When the AP connection channel of the peer is 5 GHz, the process may proceed to operation 1906, and when the AP connection channel of the peer is not 5 GHz, the process may proceed to operation 1907. In operation 1906, the TV may determine, as a P2P operating channel, 5 GHz being a preference operating channel of the peer. Because the peer has already been connected to an AP with a 5 GHz band, the preference operating channel of the peer may be 5 GHz. In operation 1907, the TV may determine, as a P2P operating channel, a 5 GHz channel that the TV prefers. Because the TV has been connected to BT, 5 GHz may become a preference channel of the TV.

In operation 1908, the TV may determine whether the peer has been connected to a BT device. When the peer has been connected to a BT device, the process may proceed to operation 1905, and when the peer has been connected to no BT device, the process may proceed to operation 1909.

In operation 1909, the TV may determine whether an AP connection channel of the peer is a 2.4 GHz channel being the same channel as an AP connected to the TV. When the AP connection channel of the peer is 2.4 GHz, the process may proceed to operation 1910, and when the AP connection channel of the peer is not 2.4 GHz, the process may proceed to operation 1905.

In operation 1910, the TV may determine whether the peer supports RSDB. When the peer supports RSDB, the process may proceed to operation 1907, and when the peer does not support RSDB, the process may proceed to operation 1911. In operation 1911, the TV may determine, as a P2P operating channel, the 2.4 GHz band channel being the AP channel connected to the TV.

In operation 1912, the TV may determine whether the TV supports MCC. When the TV does not support MCC, the process may proceed to operation 1911, and when the TV supports MCC, the process may proceed to operation 1913.

In operation 1913, the TV may determine whether the peer supports RSDB. When the TV supports RSDB, the process may proceed to operation 1915, and when the peer does not support RSDB, the process may proceed to operation 1914.

In operation 1914, the TV may determine whether the AP connection channel of the peer is 5 GHz. When the AP connection channel of the peer is 5 GHz, the process may proceed to operation 1906, and when the AP connection channel of the peer is not 5 GHz, the process may proceed to operation 1911.

In operation 1915, the TV may determine whether the peer has been connected to an AP. When the peer has been connected to an AP, the process may proceed to operation 1914, and when the peer has not been connected to an AP, the process may proceed to operation 1911.

FIGS. 20 to 23 illustrate, when a device to operate as a GO has been connected to an AP of a 2.4 GHz band, operating channel settings in a case in which a BT connection is considered and a case in which a BT connection is not considered, according to scenarios depending on whether the device to operate as the GO supports RSDB, whether the device has been connected to BT, an AP connection channel of the counterpart device, and whether the counterpart device supports RSDB.

It is assumed that the device to operate as a GO supports RSDB and the device has been connected to a BT device. In this case, when a preference channel of the counterpart device is 5 GHz, a P2P operating channel may be set to the preference channel of the counterpart device, and when the preference channel of the counterpart device is 2.4 GHz, a P2P operating channel may be set to a 5 GHz basic preference channel of the device to operate as a GO. In the case 2-1, when the counterpart device supports MCC and the device to operate as a GO has been connected to the BT device, a 5 GHz P2P connection may reduce 2.4 GHz interference compared to a 2.4 GHz P2P connection although MCC is generated in the counterpart device. Therefore, wireless quality performance may be improved compared to the case in which a BT connection is not considered. In scenarios of case 2-2, case 2-3, and case 2-4, a P2P operating channel may be set in the same way as the case in which a BT connection is not considered.

FIG. 20 shows an operating channel setting in a case (case 2-1) in which both a TV and a peer have been connected to an AP with a 2.4 GHz band, according to an embodiment of the disclosure. There is a pre-emptive condition that the TV supports DBS and the peer supports/does not support RSDB.

Referring to FIG. 20, (a) and (b) represent cases in which a BT connection is not considered. In the case (a), because both the TV and the peer have been connected to the AP with a 2.4 GHz band and both the TV and the peer support DBS and RSDB, respectively, a P2P operating channel between the TV and the peer may be determined as 5 GHz. In the case (b), because the peer does not support RSDB, a P2P operating channel between the TV and the peer may be determined as 2.4 GHz.

(c) and (d) represent cases in which a BT connection is considered. In the case (c), because the TV has been connected to BT, a P2P operating channel between the TV and the peer may be determined as 5 GHz. In the case (d), because the peer does not support RSDB, a P2P operating channel between the TV and the peer may be determined as 2.4 GHz to prevent generation of MCC in the peer. However, by preferentially considering that the TV has been connected to BT, a P2P operating channel between the TV and the peer may be determined as 5 GHz.

Figure 21:
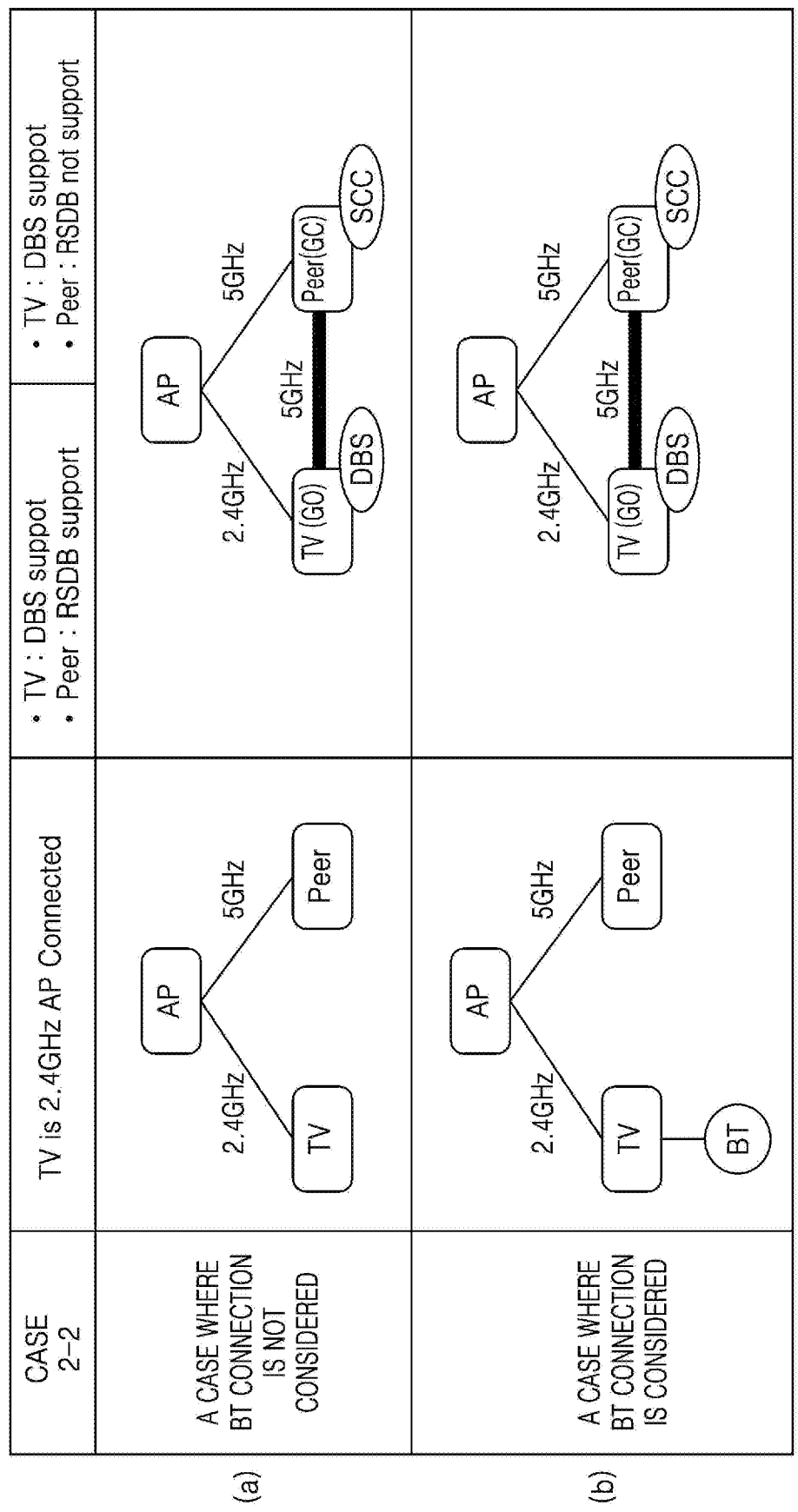
FIG. 21 shows an operating channel setting in a case (case 2-2) in which a TV has been connected to an AP with a 2.4 GHz band and a peer has been connected to the AP with a 5 GHz band, according to an embodiment of the disclosure.

FIG. 21 shows an operating channel setting in a case (case 2-2) in which a TV has been connected to an AP with a 2.4 GHz band and a peer has been connected to the AP with a 5 GHz band, according to an embodiment of the disclosure. There is a pre-emptive condition that the TV supports DBS and the peer supports/does not support RSDB.

Referring to FIG. 21, (a) represents a case in which a BT connection is not considered. In the case (a), because the TV supports DBS, a P2P operating channel between the TV and the peer may be determined as 5 GHz. (b) represents a case in which a BT connection is considered. By preferentially considering a BT connection, a P2P operating channel between the TV and the peer may be determined as 5 GHz.

Figure 22:
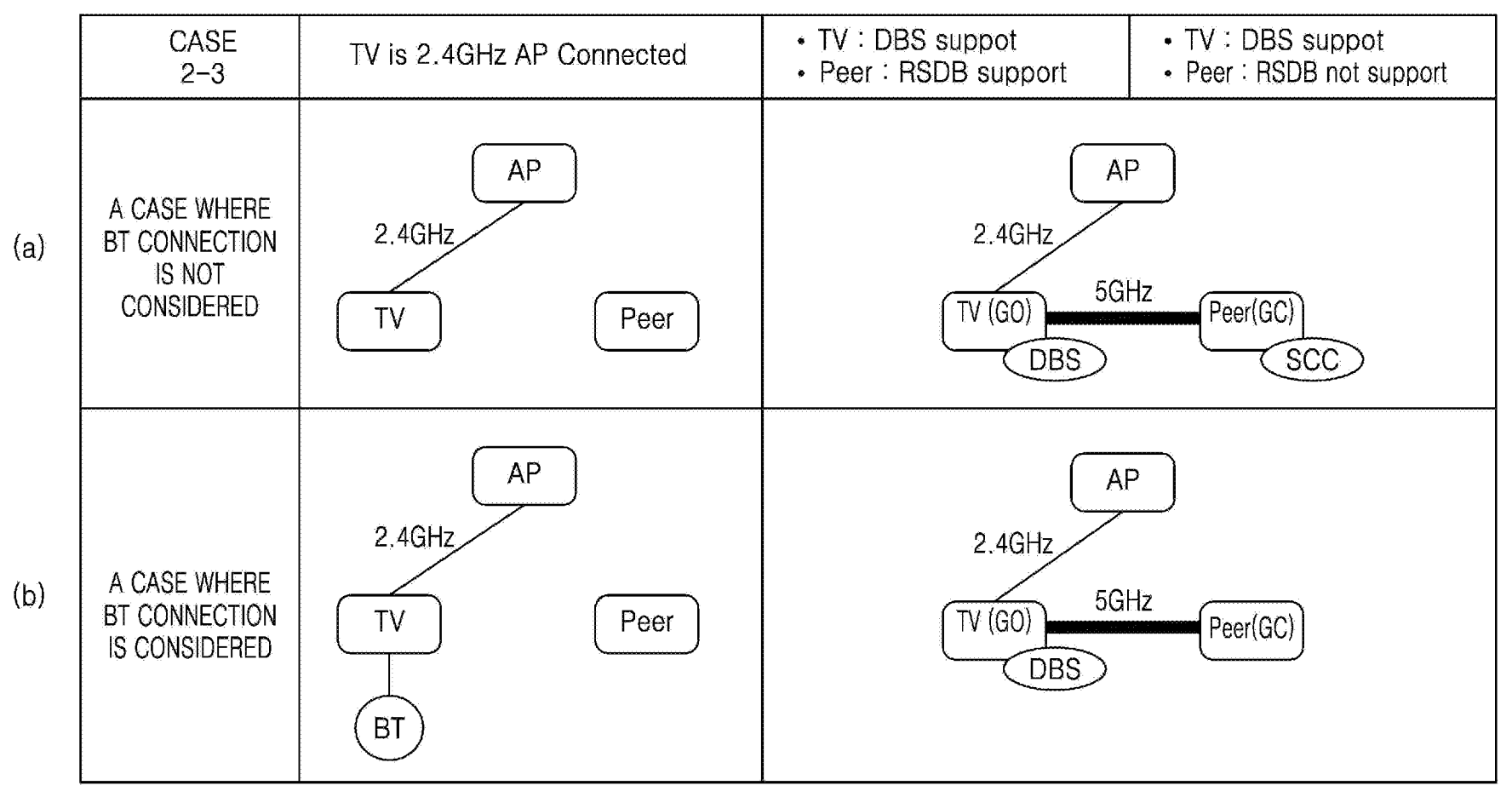

FIG. 22 shows an operating channel setting in a case (case 2-3) in which a TV has been connected to an AP with a 2.4 GHz band and a peer has not been connected to an AP, according to an embodiment of the disclosure. There is a pre-emptive condition that the TV supports DBS and the peer supports/does not support RSDB.

Referring to FIG. 22, (a) represents a case in which a BT connection is not considered. In the case (a), because the TV supports DBS and has been connected to an AP with a 2.4 GHz band and the peer has not been connected to an AP, a P2P operating channel between the TV and the peer may be determined as 5 GHz. (b) represents a case in which a BT connection is considered. By preferentially considering a BT connection, a P2P operating channel between the TV and the peer may be determined as 5 GHz not overlapping with a BT connection band.

Figure 23:
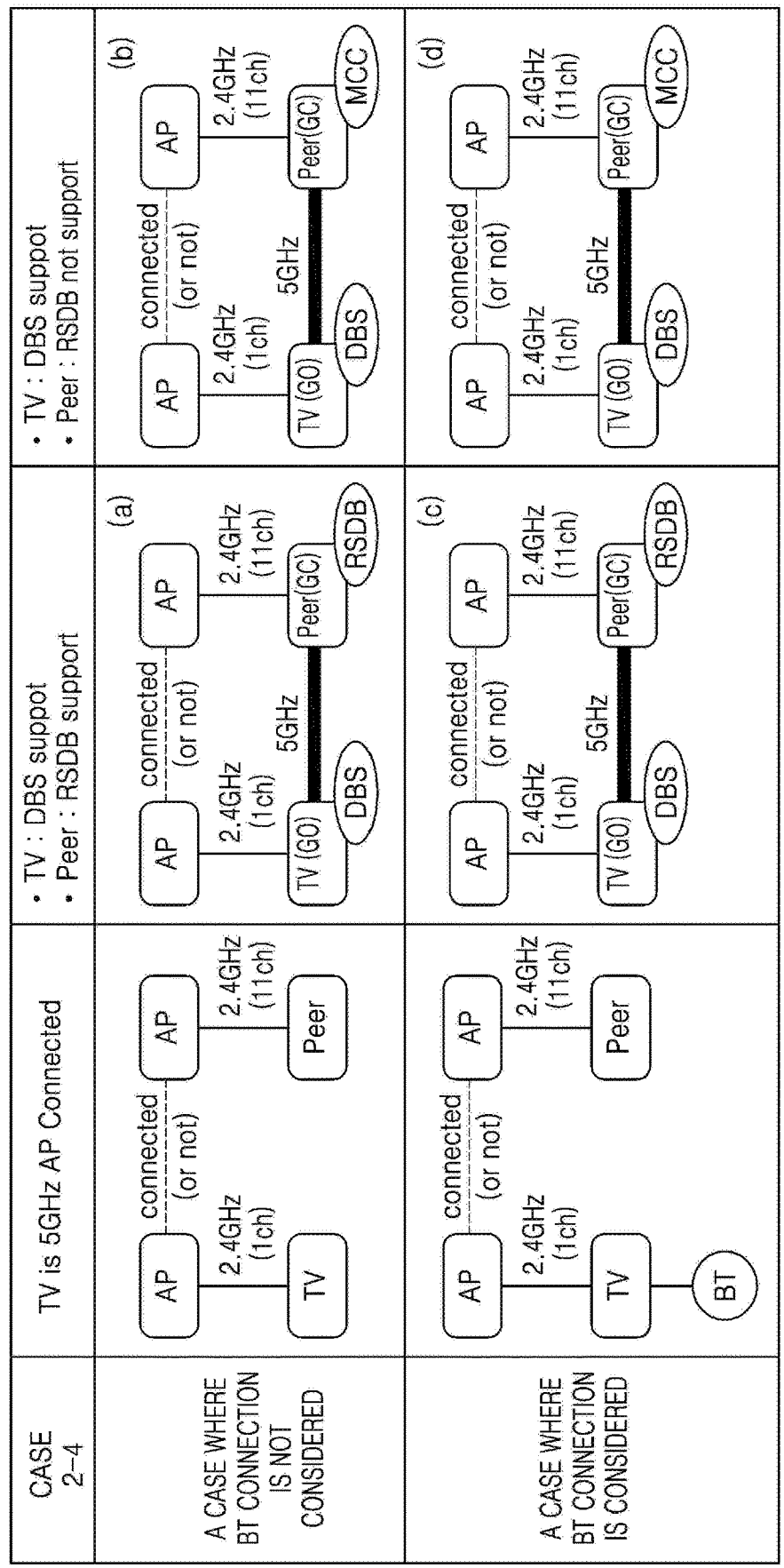
FIG. 23 shows an operating channel setting in a case (case 2-4) in which a TV and a peer have been connected to APs with different channels of a 2.4 GHz band, according to an embodiment of the disclosure.

FIG. 23 shows an operating channel setting in a case (case 2-4) in which a TV and a peer have been connected to APs with different channels of 2.4 GHz, according to an embodiment of the disclosure. There is a pre-emptive condition that the TV supports DBS and a peer supports/does not support RSDB.

Referring to FIG. 23, (a) and (b) represent cases in which a BT connection is not considered. In the case (a), because the TV and the peer have been connected to the APs with different channels of a 2.4 GHz band and both the TV and the peer support DBS and RSDB, respectively, a P2P operating channel between the TV and the peer may be determined as 5 GHz. In the case (b), because the TV and the peer have been connected to APs of different channels although the TV and the peer have been connected to the APs of the same 2.4 GHz band, MCC avoidance is impossible. However, because the TV supports DBS, a P2P operating channel between the TV and the peer may be determined as 5 GHz.

(c) and (d) represent cases in which a BT connection is considered, and in the case (c), because the TV has been connected to BT, a P2P operating channel between the TV and the peer may be determined as 5 GHz. In the case (d), because the TV and the peer have been connected to APs of different channels although the TV and the peer have been connected to the APs of the same 2.4 GHz band, MCC avoidance is impossible. However, by preferentially considering that the TV supports DBS and has been connected to BT, a P2P operating channel between the TV and the peer may be determined as 5 GHz.

Figure 24:
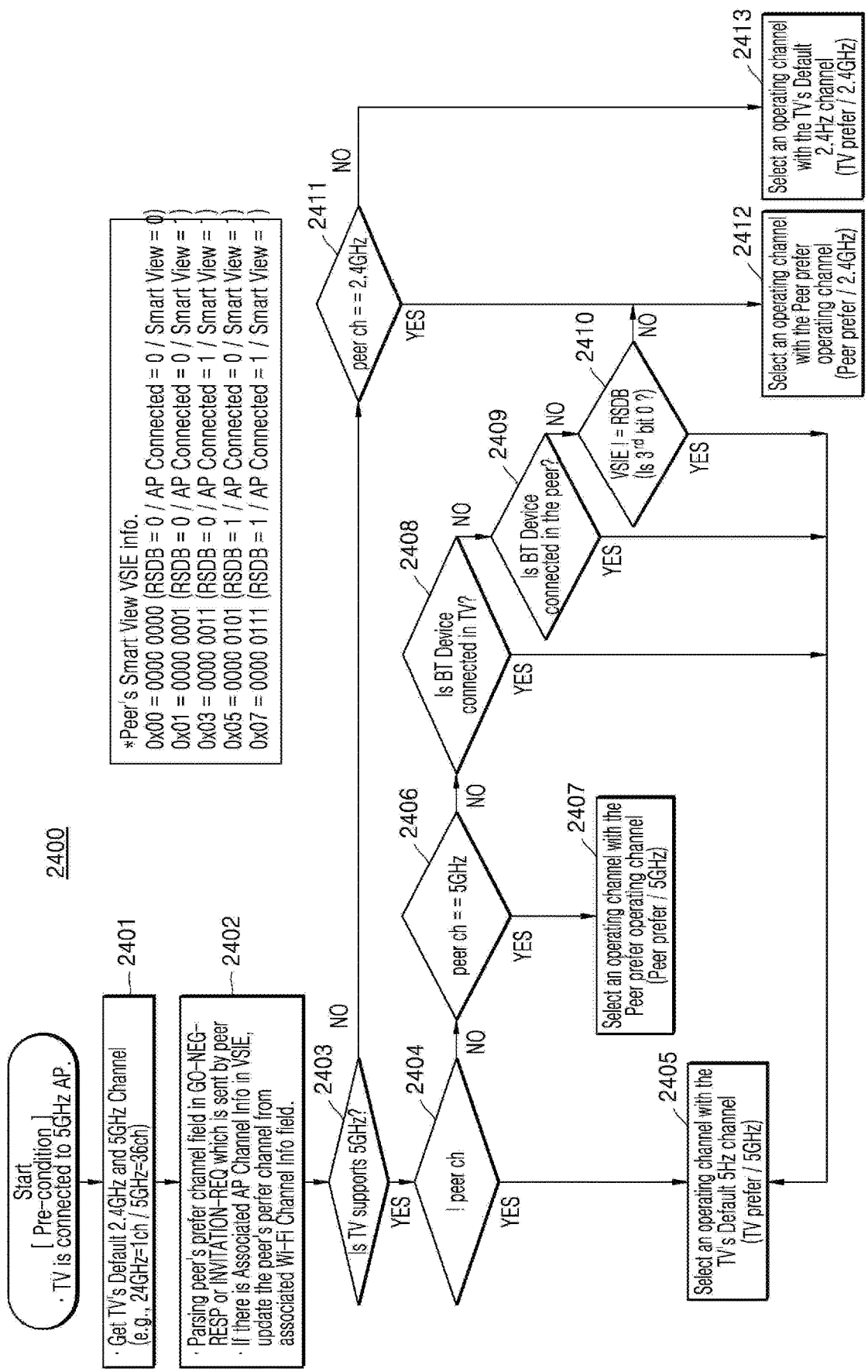
FIG. 24 shows a logic for setting a P2P operating channel when a TV has not been connected to an AP or the TV has been connected to an AP in a wired fashion.

FIG. 24 shows a logic 2400 for setting a P2P operating channel when a TV has not been connected to an AP or when the TV has been connected to the AP in a wired fashion. In the logic 2400, there is a pre-emptive condition that the TV has not been connected to an AP or connected to an AP in a wired fashion.

Referring to FIG. 24, in operation 2401, the TV may acquire defaults 2.4 GHz and 5 GHz channels of the TV. For example, a 1st channel may be acquired for 2.4 GHz and a 36th channel may be acquired for 5 GHz.

In operation 2402, a preference channel field of a peer may be parsed from a GO negotiation response frame or an invitation request frame sent by the peer. When there is AP channel information associated with VSIE, the TV may update a preference channel of the peer from an associated Wi-Fi channel information field.

In operation 2403, the TV may determine whether it supports 5 GHz. When the TV does not support 5 GHz, the process may proceed to operation 2411, and when the TV supports 5 GHz, the process may proceed to operation 2404.

In operation 2404, the TV may determine whether its channel is identical to a peer channel. When the channel of the TV is not identical to the peer channel, the process may proceed to operation 2405, and when the channel of the TV is identical to the peer channel, the process may proceed to operation 2406.

In operation 2405, the TV may determine the 5 GHz default channel of the TV as a P2P operating channel. In operation 2406, the TV may determine whether the peer channel is 5 GHz. When the peer channel is 5 GHz, the process may proceed to operation 2407, and when the peer channel is not 5 GHz, the process may proceed to operation 2408.

In operation 2407, the TV may determine 5 GHz being a preference operating channel of the peer, as a P2P operating channel.

In operation 2408, the TV may determine whether the TV has been connected to a BT device. When the TV has been connected to a BT device, the process may proceed to operation 2405, and when the TV has been connected to no BT device, the process may proceed to operation 2409.

In operation 2409, the TV may determine whether the peer has been connected to BT. When the peer has been connected to BT, the process may proceed to operation 2405, and when the peer has not been connected to BT, the process may proceed to operation 2410. In operation 2410, the TV may determine whether the peer supports RSDB. When the peer supports RSDB, the process may proceed to operation 2405, and when the peer does not support RSDB, the process may proceed to operation 2412.

In operation 2412, the TV may select a 2.4 GHz channel being a preference channel of the peer, as a P2P operating channel.

In operation 2411, the TV may determine whether an AP-connected channel of the peer is 2.4 GHz. When the AP-connected channel of the peer is 2.4 GHz, the process may proceed to operation 2412, and when the AP-connected channel of the peer is not 2.4 GHz, the process may proceed to operation 2413.

In operation 2413, the TV may determine the default 2.4 GHz channel of the TV as a P2P operating channel.

Figure 25:
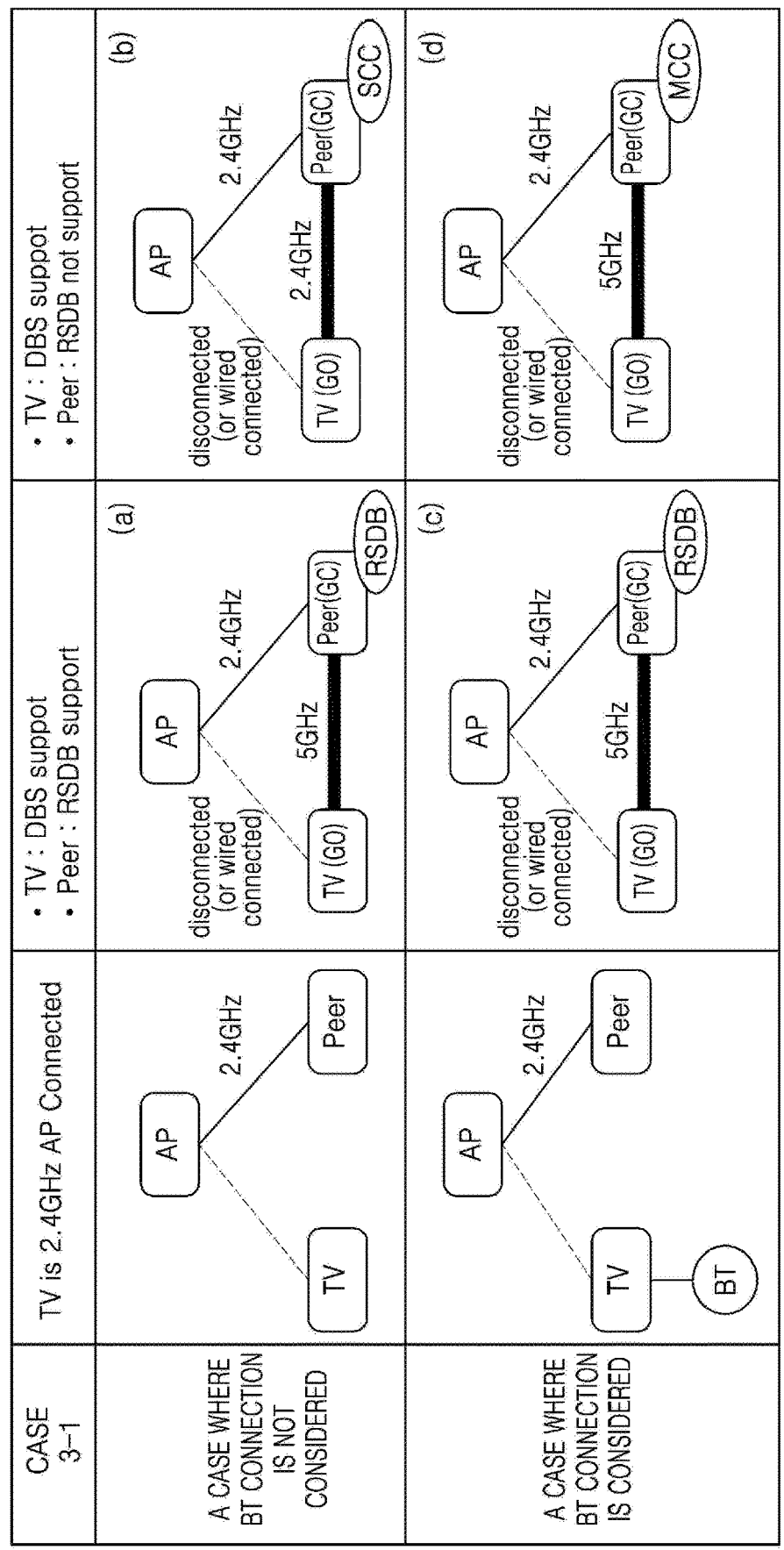
FIG. 25 shows an operating channel setting in a case (case 3-1) in which a TV has not been connected to an AP in a wireless fashion and a peer has been connected to an AP with a 2.4 GHz band, according to an embodiment of the disclosure.
Figure 26:
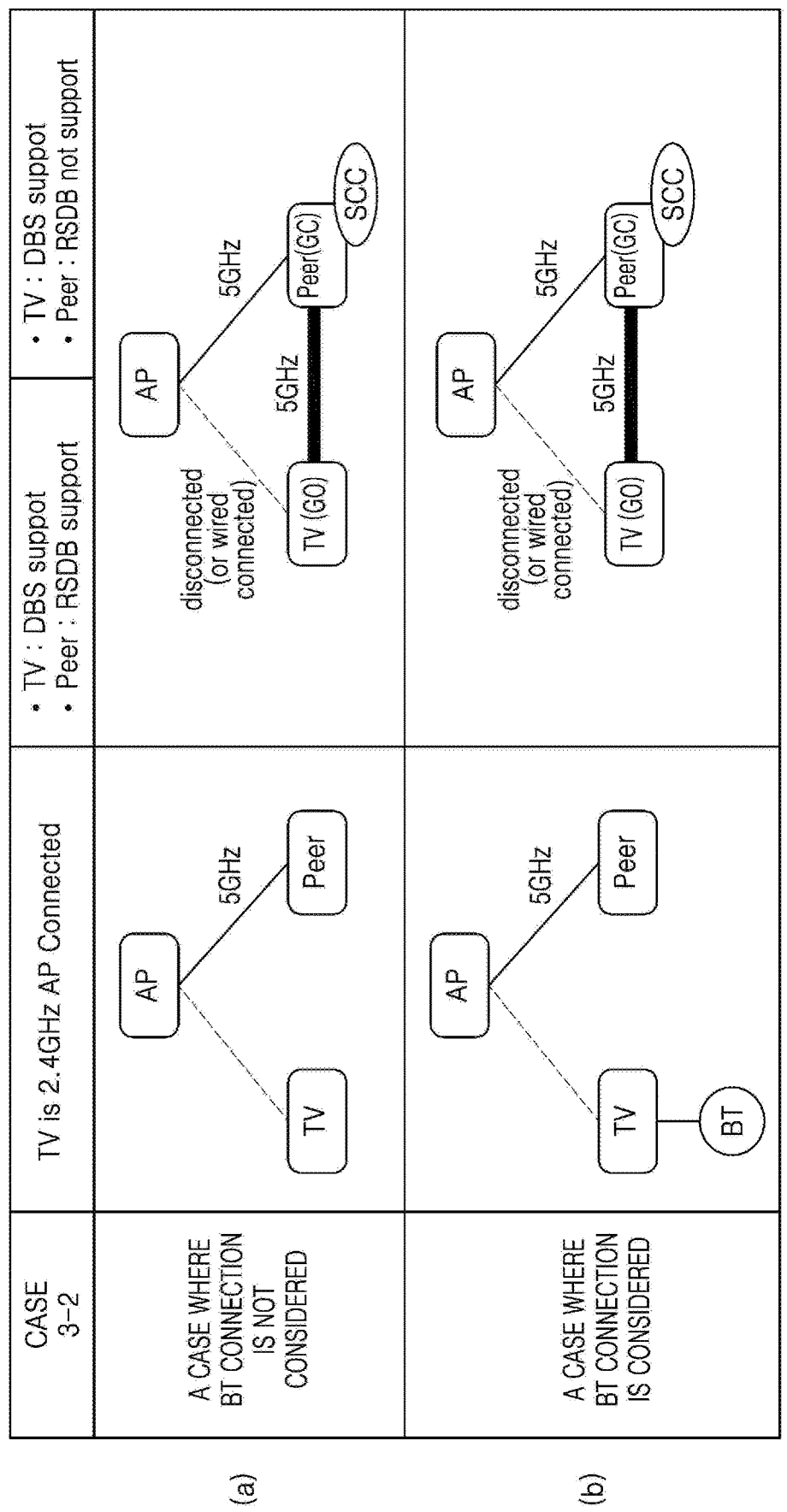
FIG. 26 shows an operating channel setting in a case (case 3-2) in which a TV has not been connected to an AP in a wireless fashion and a peer has been connected to an AP with a 5 GHz band, according to an embodiment of the disclosure.
Figure 27:
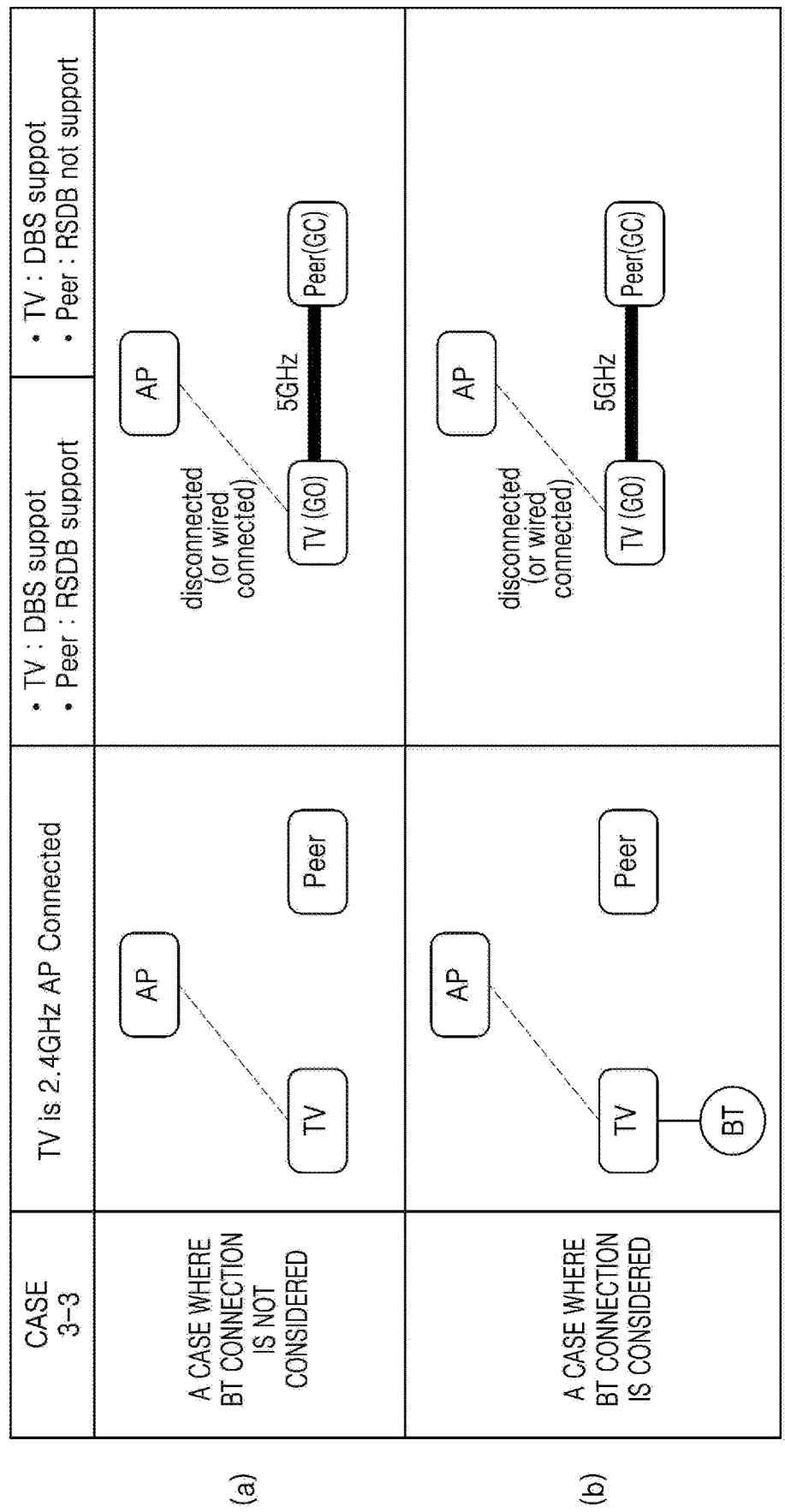
FIG. 27 shows an operating channel setting in a case (case 3-3) in which neither a TV nor a peer has been connected to an AP, according to an embodiment of the disclosure.

FIGS. 25 to 27 illustrate, when a device to operate as a GO has been connected to no wireless AP, operating channels between a case in which there is a BT connection and a case in which there is no BT connection, according to scenarios depending on whether the device to operate as the GO supports RSDB, whether the device has been connected to BT, an AP connection channel of the counterpart device, and whether the counterpart device supports RSDB. However, in a case (case 3-1) in which the counterpart device has been connected to an AP of a 2.4 GHz channel, a P2P operating channel may be set to a 5 GHz AP channel connected to the device to operate as the GO according to a scenario of connecting to a BT device simultaneously according to an operating channel setting method of the disclosure, thereby reducing interference of the 2.4 GHz band. When the counterpart device supporting MCC has been connected to a BT device, a 5 GHz P2P connection may reduce 2.4 GHz interference compared to a 2.4 GHz P2P connection although MCC occurs in the counterpart device, thereby improving wireless quality performance.

FIG. 25 shows an operating channel setting in a case (case 3-1) in which a TV has not been connected to an AP in a wireless fashion and a peer has been connected to an AP with a 2.4 GHz band, according to an embodiment of the disclosure. There is a pre-emptive condition that the TV supports DBS and the peer supports/does not support RSDB.

Referring to FIG. 25, (a) and (b) represent cases in which no BT connection is considered. In the case (a), the TV has been connected to an AP, and the peer has been connected to an AP with a 2.4 GHz band. However, because the peer supports RSDB, a P2P operating channel between the TV and the peer may be determined as 5 GHz. In the case (b), because the peer does not support RSDB, a P2P operating channel between the TV and the peer may be determined as 2.4 GHz.

(c) and (d) represent cases in which a BT connection is considered. In the case (d), because the peer does not support RSDB, a P2P operating channel between the TV and the peer may be determined as 2.4 GHz to prevent MCC generation of the peer. However, by preferentially considering that the TV has been connected to BT, a P2P operating channel between the TV and the peer may be determined as 5 GHz.

FIG. 26 shows an operating channel setting in a case (case 3-2) in which a TV has not been connected to an AP in a wireless fashion and a peer has been connected to an AP with a 5 GHz band, according to an embodiment of the disclosure. There is a pre-emptive condition that a TV supports DBS and a peer supports/does not support RSDB.

Referring to FIG. 26, (a) represents a case in which a BT connection is not considered. In the case (a), because the TV has not been connected to an AP and the peer has been connected to the AP with a 5 GHz band, a P2P operating channel between the TV and the peer may be determined as 5 GHz.

(b) represents a case in which a BT connection is considered. In the case (b), because the TV has been connected to BT, a P2P operating channel between the TV and the peer may be determined as 5 GHz.

FIG. 27 shows an operating channel setting in a case (case 3-3) in which neither a TV nor a peer have been connected to an AP, according to an embodiment of the disclosure. There is a pre-emptive condition that the TV supports DBS and the peer supports/does not support RSDB.

Referring to FIG. 27, (a) represents a case in which a BT connection is not considered. In the case (a), because neither the TV nor the peer have been connected to an AP, a P2P operating channel between the TV and the peer may be determined as 5 GHz.

(b) represents a case in which a BT connection is considered. In the case (b), because the TV has been connected to BT, a P2P operating channel between the TV and the peer may also be determined as 5 GHz.

The method of operating the electronic device according to an embodiment of the disclosure may be implemented in a program command form that can be executed by various computer means, and may be recorded on computer-readable media. The computer-readable media may also include, alone or in combination with program commands, data files, data structures, and the like. Program commands recorded in the media may be the kind specifically designed and constructed for the purposes of the disclosure or well-known and available to those of ordinary skill in the computer software field. Examples of the computer-readable media include magnetic media, such as hard disks, floppy disks, and magnetic tapes, optical media, such as CD-ROM and DVD, magneto-optical media such as floptical disks, and hardware devices, such as ROM, RAM, flash memory, and the like, specifically configured to store and execute program commands. Examples of the program commands include high-level language codes that can be executed on a computer through an interpreter or the like, as well as machine language codes produced by a compiler.

According to embodiments of the disclosure, by determining in advance whether there is a BT connection when a Wi-Fi Direct P2P connection is established to determine a P2P operating channel, a wireless bandwidth may be secured and 2.4 GHz band interference may be reduced so that quality deterioration of both a BT service and an application service may be prevented.

It will be apparent to those of ordinary skill in the art that various modifications and variations can be made in the disclosure without departing from the spirit or scope of the disclosure.

What is claimed is:

1. An electronic device comprising:
   a communication interface comprising:
      a first communication interface which communicates based on a first communication standard using a first frequency band, and
      a second communication interface which communicates based on a second communication standard using at least one of the first frequency band and a second frequency band;
   a memory storing one or more instructions; and
   a processor configured to execute the one or more instructions stored in the memory to:
      acquire connection information of the electronic device indicating whether the electronic device is currently connected with an external device through the first communication interface using the first communication standard,
      obtain, from a peer device attempting to establish a peer-to-peer, P2P, connection according to the second communication standard to the electronic device, access point connection information of the peer device comprising information on a frequency band which is currently used in a wireless connection which the peer device communicates with an access point based on the second communication standard,
      when the frequency band which is currently used in the wireless connection which the peer device communicates with the access point based on the second communication standard is the first frequency band, and the connection information of the electronic device indicates that the electronic device is connected with the external device through the first communication interface using the first communication standard, determine a P2P operating frequency band between the electronic device and the peer device as the second frequency band,
      when the frequency band which is currently used in the wireless connection which the peer device communicates with the access point based on the second communication standard is the first frequency band, and the connection information of the electronic device indicates that the electronic device is not connected with the external device through the first communication interface using the first communication standard, determine the P2P operating frequency band between the electronic device and the peer device as the first frequency band, and
      establish a P2P connection between the electronic device and the peer device according to the determined P2P operating frequency band.

2. The electronic device of claim 1, wherein the first communication standard is Bluetooth, and the second communication standard is WiFi.

3. The electronic device of claim 1, wherein the first frequency band is 2.4 GHz, and the second frequency band is 5 GHz.

4. The electronic device of claim 1, wherein the processor is further configured to execute the one or more instructions to acquire the access point connection information of the peer device from a message received from the peer device for a P2P search or a connection request.

5. The electronic device of claim 4, wherein the message received from the peer device comprises at least one of a group owner, GO, negotiation request message or an invitation request message.

6. The electronic device of claim 5, wherein the access point connection information of the peer device is acquired through a vender specific information element of the GO negotiation request message or the invitation request message.

7. The electronic device of claim 1, wherein the processor is further configured to execute the one or more instructions to determine the P2P operating channel further based on information about whether the electronic device supports dual simultaneous band (DSB) and information about whether the peer device supports real simultaneous dual band (RSDB).

8. An operating method of an electronic device comprising a first communication interface which communicates based on a first communication standard using a first frequency band, and a second communication interface which communicates based on a second communication standard using at least one of the first frequency band and a second frequency band, the operating method comprising:
   acquiring connection information of the electronic device indicating whether the electronic device is currently connected with an external device through the first communication interface using the first communication standard,
   obtaining, from a peer device attempting to establish a peer-to-peer, P2P, connection according to the second communication standard to the electronic device, access point connection information of the peer device comprising information on a frequency band which is currently used in a wireless connection which the peer device communicates with an access point based on the second communication standard,
   when the frequency band is currently used in the wireless connection which the peer device communicates with the access point based on the second communication standard is the first frequency band, and the connection information of the electronic device indicates that the electronic device is connected with the external device through the first communication interface using the first communication standard, determining a P2P operating frequency band between the electronic device and the peer device as the second frequency band, when the frequency band which is currently used in the wireless connection which the peer device communicates with the access point based on the second communication standard is the first frequency band, and the connection information of the electronic device indicates that the electronic device is not connected with the external device through the first communication interface using the first communication standard, determining the P2P operating frequency band between the electronic device and the peer device as the first frequency band, and establishing a P2P connection between the electronic device and the peer device according to the determined P2P operating frequency band.

9. The operating method of claim 8, wherein the first communication standard is Bluetooth, and the second communication standard is WiFi.

10. The operating method of claim 8, wherein the first frequency band is 2.4 GHZ, and the second frequency band is 5 GHZ.

11. The operating method of claim 8, further comprising acquiring the access point connection information of the peer device from a message received from the peer device for a P2P search or a connection request.

12. The operating method of claim 11, wherein the message received from the peer device comprises at least one of a group owner, GO, negotiation request message or an invitation request message.

13. The operating method of claim 12, wherein the access point connection information of the peer device is acquired through a vender specific information element of the GO negotiation request message or the invitation request message.

14. A computer program product comprising a non-transitory computer-readable recording medium storing a program for performing an operating method of an electronic device comprising a first communication interface which communicates based on a first communication standard using a first frequency band, and a second communication interface which communicates based on a second communication standard using at least one of the first frequency band and a second frequency band, the operating method comprising:

acquiring connection information of the electronic device indicating whether the electronic device is currently connected with an external device through the first communication interface using the first communication standard, obtaining, from a peer device attempting to establish a peer-to-peer, P2P, connection according to the second communication standard to the electronic device, access point connection information of the peer device comprising information on a frequency band which is currently used in a wireless connection which the peer device communicates with an access point based on the second communication standard, when the frequency band which is currently used in the wireless connection which the peer device communicates with the access point based on the second communication standard is the first frequency band, and the connection information of the electronic device indicates that the electronic device is connected with the external device through the first communication interface using the first communication standard, determining a P2P operating frequency band between the electronic device and the peer device as the second frequency band, when the frequency band which is currently used in the wireless connection which the peer device communicates with the access point based on the second communication standard is the first frequency band, and the connection information of the electronic device indicates that the electronic device is not connected with the external device through the first communication interface using the first communication standard, determine the P2P operating frequency band between the electronic device and the peer device as the first frequency band, and establishing a P2P connection between the electronic device and the peer device according to the determined P2P operating frequency band.

* * * * *